US009268602B2

(12) United States Patent
Prahlad et al.

(10) Patent No.: US 9,268,602 B2
(45) Date of Patent: Feb. 23, 2016

(54) SYSTEMS AND METHODS FOR PERFORMING DATA MANAGEMENT OPERATIONS USING SNAPSHOTS

(71) Applicant: CommVault Systems, Inc., Oceanport, NJ (US)

(72) Inventors: Anand Prahlad, Bangalore (IN); Rahul S. Pawar, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 164 days.

(21) Appl. No.: 14/083,089

(22) Filed: Nov. 18, 2013

(65) Prior Publication Data

US 2014/0075440 A1    Mar. 13, 2014

Related U.S. Application Data

(62) Division of application No. 12/979,101, filed on Dec. 27, 2010, now Pat. No. 8,595,191.

(60) Provisional application No. 61/291,803, filed on Dec. 31, 2009.

(51) Int. Cl.
*G06F 9/455* (2006.01)
*G06F 17/00* (2006.01)
*G06F 9/48* (2006.01)
*G06F 17/30* (2006.01)

(52) U.S. Cl.
CPC ........ *G06F 9/4856* (2013.01); *G06F 17/30088* (2013.01); *G06F 17/30091* (2013.01)

(58) Field of Classification Search
None
See application file for complete search history.

(56) References Cited

U.S. PATENT DOCUMENTS

| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

Fegreus, CommVault Simpana 8.0, Mar. 3, 2010, virtual-strategy.com/2010/03/03/commvault-simpana.

(Continued)

*Primary Examiner* — Tammy Lee
(74) *Attorney, Agent, or Firm* — Perkins Coie LLP

(57) ABSTRACT

A system stores a snapshot and an associated data structure or index to storage media to create a secondary copy of a volume of data. In some cases, the associated index includes application specific data about a file system or other application that created the data to identify the location of the data. The associated index may include three entries, and may be used to facilitate the recovery of data via the snapshot. The snapshot may be used by ancillary applications to perform various functions, such as content indexing, data classification, deduplication, e-discovery, and other functions.

12 Claims, 12 Drawing Sheets

(56) References Cited

U.S. PATENT DOCUMENTS

| | | |
|---|---|---|
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,904 B1 | 2/2002 | Bartmann et al. |
| RE37,601 E | 3/2002 | Eastridge et al. |
| 6,356,801 B1 | 3/2002 | Goodman et al. |
| 6,366,986 B1 | 4/2002 | St. Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,959,310 B2 | 10/2005 | Eshel et al. |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |
| 7,346,623 B2 | 3/2008 | Prahlad et al. |
| 7,383,538 B2 | 6/2008 | Bates et al. |
| 7,386,532 B2 | 6/2008 | Kiessig et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,426,052 B2 | 9/2008 | Cox et al. |
| 7,480,779 B2 | 1/2009 | Tsuji |
| 7,509,316 B2 | 3/2009 | Greenblatt et al. |
| 7,523,278 B2 | 4/2009 | Thompson et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,567,991 B2 | 7/2009 | Armangau et al. |
| 7,568,080 B2 | 7/2009 | Prahlad et al. |
| 7,580,950 B2 | 8/2009 | Kavuri et al. |
| 7,587,563 B1 | 9/2009 | Teterin et al. |

(56) References Cited

U.S. PATENT DOCUMENTS

| | | | |
|---|---|---|---|
| 7,596,611 B1 | 9/2009 | Satish et al. |
| 7,600,219 B2 | 10/2009 | Tsantilis |
| 7,620,666 B1 | 11/2009 | Root et al. |
| 7,651,593 B2 | 1/2010 | Prahlad et al. |
| 7,668,884 B2 | 2/2010 | Prahlad et al. |
| 7,707,184 B1 | 4/2010 | Zhang et al. |
| 7,716,171 B2 | 5/2010 | Kryger |
| 7,716,183 B2 | 5/2010 | Lee |
| 7,725,440 B2 | 5/2010 | Reed et al. |
| 7,734,578 B2 | 6/2010 | Prahlad et al. |
| 7,761,456 B1 | 7/2010 | Cram et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,873,806 B2 | 1/2011 | Prahlad et al. |
| 7,882,077 B2 | 2/2011 | Gokhale et al. |
| 7,933,927 B2 | 4/2011 | Dee et al. |
| 7,979,389 B2 | 7/2011 | Prahlad et al. |
| 8,055,625 B2 | 11/2011 | Prahlad et al. |
| 8,140,786 B2 | 3/2012 | Bunte et al. |
| 8,140,794 B2 | 3/2012 | Prahlad et al. |
| 8,170,995 B2 | 5/2012 | Prahlad et al. |
| 8,195,623 B2 | 6/2012 | Prahlad et al. |
| 8,219,524 B2 | 7/2012 | Gokhale |
| 8,285,671 B2 | 10/2012 | Prahlad et al. |
| 8,307,177 B2 | 11/2012 | Prahlad et al. |
| 8,433,682 B2 | 4/2013 | Ngo |
| 8,433,872 B2 | 4/2013 | Prahlad et al. |
| 8,442,944 B2 | 5/2013 | Prahlad et al. |
| 8,468,518 B2 | 6/2013 | Wipfel |
| 8,543,998 B2 | 9/2013 | Barringer |
| 2002/0107877 A1 | 8/2002 | Whiting et al. |
| 2003/0028514 A1 | 2/2003 | Lord et al. |
| 2003/0033346 A1 | 2/2003 | Carlson et al. |
| 2003/0167380 A1 | 9/2003 | Green et al. |
| 2003/0177149 A1 | 9/2003 | Coombs |
| 2004/0139125 A1 | 7/2004 | Strassburg et al. |
| 2004/0170374 A1 | 9/2004 | Bender et al. |
| 2004/0230566 A1 | 11/2004 | Balijepalli et al. |
| 2004/0250033 A1 | 12/2004 | Prahlad et al. |
| 2004/0260678 A1 | 12/2004 | Verbowski et al. |
| 2005/0086241 A1 | 4/2005 | Ram et al. |
| 2005/0203864 A1 | 9/2005 | Schmidt et al. |
| 2005/0216788 A1* | 9/2005 | Mani-Meitav et al. ........... 714/6 |
| 2006/0224846 A1 | 10/2006 | Amarendran et al. |
| 2007/0185938 A1* | 8/2007 | Prahlad et al. ............. 707/204 |
| 2007/0185940 A1 | 8/2007 | Prahlad et al. |
| 2008/0028009 A1 | 1/2008 | Ngo |
| 2008/0228771 A1 | 9/2008 | Prahlad et al. |
| 2008/0243953 A1 | 10/2008 | Wu et al. |
| 2009/0260007 A1 | 10/2009 | Beaty et al. |
| 2009/0300641 A1 | 12/2009 | Friedman et al. |
| 2009/0319534 A1 | 12/2009 | Gokhale |
| 2010/0070474 A1 | 3/2010 | Lad |
| 2010/0070726 A1 | 3/2010 | Ngo et al. |
| 2010/0076934 A1* | 3/2010 | Pershin ............... G06F 11/1451 |
| | | | 707/640 |
| 2010/0082672 A1 | 4/2010 | Kottomtharayil et al. |
| 2010/0250549 A1 | 9/2010 | Muller et al. |
| 2010/0250824 A1* | 9/2010 | Belay ............................. 711/6 |
| 2010/0293144 A1 | 11/2010 | Bonnet |
| 2010/0293146 A1* | 11/2010 | Bonnet ................... G06F 9/455 |
| | | | 707/640 |
| 2010/0299490 A1 | 11/2010 | Attarde et al. |
| 2010/0312754 A1 | 12/2010 | Bear et al. |
| 2010/0313185 A1 | 12/2010 | Gupta et al. |
| 2011/0161299 A1 | 6/2011 | Prahlad et al. |
| 2012/0254824 A1 | 10/2012 | Bansod |
| 2013/0013563 A1 | 1/2013 | Prahlad et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0838758 | 4/1998 |
| EP | 0899662 A1 | 3/1999 |
| EP | 0981090 A1 | 2/2000 |
| EP | 1349088 | 10/2003 |
| EP | 1380947 | 1/2004 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000347811 | 12/2000 |
| WO | WO-9303549 | 2/1993 |
| WO | WO-9513580 A1 | 5/1995 |
| WO | WO-9912098 A1 | 3/1999 |
| WO | WO-0104755 A1 | 1/2001 |
| WO | WO-02-088943 | 11/2002 |
| WO | WO-03028183 | 4/2003 |
| WO | WO-03046768 A1 | 6/2003 |
| WO | WO-2004034197 | 4/2004 |
| WO | WO-2007021997 A2 | 2/2007 |
| WO | WO-2008080143 | 7/2008 |

OTHER PUBLICATIONS

Harriman-Polanski, CommVault Galaxy Enhances Data Protection, Reprinted from Dell Power Solutions, May 2006.

Managing Data More Effectively in Virtualized Environments with CommVault® Simpana® Universal Virtual Software Agent, © 1999-2009.

U.S. Appl. No. 13/792,104, filed Mar. 10, 2013, Varadharajan et al.

U.S. Appl. No. 13/893,967, May 14, 2013, Prahlad et al.

U.S. Appl. No. 13/873,085, Apr. 29, 2013, Prahlad et al.

U.S. Appl. No. 13/874,323, filed Apr. 30 2013, Prahlad et al.

International Search Report and Written Opinion for International Application No. PCT/US09/57102, Mail Date Nov. 6, 2009, 14 pages.

Network Appliance, Inc., "Network Appliance Snapshot Technology," copyright 2004, 1 page.

Hitachi Data Systems, "Hitachi HiCommand Protection Manager Software," Feb. 2007, 2 pages.

Microsoft TechNet, "What is Volume Shadow Copy Service?" Mar. 28, 2003, 5 pages.

EMC Corporation, "EMC CLARiiON CX Series," May 2006, 7 pages.

EMC Corporation, "EMC CLARiiON CX3 UltraScale Series," Feb. 2008, 6 pages.

Emc Corporation, "EMC Symmetrix DMX Series," Jan. 2008, 8 pages.

Garimella, N., "Understanding and Exploiting Snapshot Technology for Data Protection, Part 1: Snapshot Technology Overview," <ibm.com/developerworks/tivoli/library/t-snaptsm1/index.html>internet accessed on Dec. 22, 2009, 8 pages.

Microsoft.com, "XADM: Hot Split Snapshot Backups of Exchange," <support.microsoft.com/kb/311898/>, internet accessed on Dec. 29, 2009, 5 pages.

Microsoft TechNet, "Overview of Exchange Server Backup Methods," <technet.microsoft.com/en-us/library/aa996125(EXCHG.65,printer).aspx>, accessed on Dec. 29, 2009, 3 pages.

MSDN, "Identifying Required Transaction Logs," <msdn.microsoft.com/en-us/library/ms986606(EXCHG.65,printer).aspx>, internet accessed on Dec. 30, 2009, 1 page.

MSDN, "Backup Sequence Diagram," <msdn.microsoft.com/en-us/library/ms986539(EXCHG.65,printer).aspx>, internet accessed on Dec. 30, 2009, 1 page.

MSDN, "Exchange Transaction Logs and Checkpoint Files," <msdn.microsoft.com/en-us/library/ms986143(EXHG.65,printer).aspx>, internet accessed on Dec. 30, 2009, 1 page.

Wikipedia.org, "Snapshot (computer storage)," <wikipedia.org/w/index.php?title=Snapshot_(computer_storage)>, internet accessed on Dec. 15, 2009, 3 pages.

(56) References Cited

OTHER PUBLICATIONS

MSExchange.org, "Exchange log disk is full, Prevention and Remedies," <msexchange.org/articles/exchange-log-disk-full.html?printversion>, internet accessed on Dec. 30, 2009, 7 pages.
MSDN, "Overview of Processing a Backup Under VSS," msdn.microsoft.com/en-us/library/aa384589(VS.85,printer).aspx>, Internet accessed on Dec. 18, 2009, 3 pages.
CommVault, "Volume Shadow Services (VSS)," <documentation.commvault.com/commvault/release_8_0_0/books_online_1/english_us//features/snapshots/vss/vss.htm>, internet accessed on Dec. 23, 2009, 1 page.
CommVault Systems, Inc., "CommVault Simpana Software with SnapBackup," copyright date 1999-2009, 6 pages.
CommVault, "Snapshots," documentation.commvault.com/commvault/release_8_0_0/books_online_1/english_us/features/snapshots/snapshots.htm>, internet accessed on Dec. 15, 2009, 2 pages.
NetApp, "NetApp SnapManager for Microsoft Exchange," 2009, 2 pages.
Microsoft, "Microsoft System Center Data Protection Manager 2007: Product Overview," undated, 2 pages.
CommVault, "Snap Backup," documentation.commvault.com/commvault/release_8_0_0/books_online_1/english_us/features/snap_backup/snap_backup.htm>, internet accessed on Dec. 17, 2009, 7 pages.
Commvault, "Remote Backup," <documentation.commvault.com/commvault/release_8_0_0/books_online_1/english_us/features/ddr/ddr.htm>, internet accessed on Dec. 17, 2009, 8 pages.
Microsoft TechNet, "How Volume Shadow Copy Service Works," <technet.microsoft.com/en-us/library/cc785914(WS.10,printer).aspx>, internet accessed on Dec. 17, 2009, 6 pages.
CommVault Systems, Inc., "CommVault QiNetix: Architecture Overview," CommVault Systems White Paper, 2005, 35 pages.
CommVault Systems, Inc., "CommVault Galaxy Express 7.0 Backup & Recovery," copyright date 1999-2007, 4 pages.
Veeam Software, "The New Standard for Data Protection," internet accessed on Mar. 23, 2010, 2 pages.
Marshall, David, "Veeam's SureBackup transforms VMware image backups," <infoworld.com/print/117315>, internet accessed on Mar. 23, 2010, 4 pages.
International Search Report and Written Opinion for International Application No. PCT/US10/62158; Mail Date Feb. 23, 2011, 8 pages.
OpenAir.com, Product Update—Jun. 21, 2001, web.archive.org/web/20011007153900 1http://www.openair.com/home|n.s-ub.--p.sub.--update062101.html, Oct. 2001, 3 pages.
Australian Examiner's First Report on Patent Application No. 2009293328, Mail Date Dec. 21, 2011, 2 pages.
"Software Builds and the Virtual Machine," Dr. Dobb's, Jan. 23, 2008, 2 pages.
CNET Reviews, "IPStor Enterprise Edition ZeroImpact Backup Enabler Option—(V.4.0) Manufacturer Description", May 8, 2004, 1 page.
CommVault Partner Advantage, "CommVault First to Market with Complete 'Zero Impact' Backup Soltuions for Mixed Windows and UNIX Environments", partners.commvault.com/microsoft/microsoft_news_story.asp?id=164>, Sep. 25, 2002, 2 pages.
FalconStor Software, "Impact-free Backup of Vmware Environments", falconstor.com/dmdocuments/HyperTrac_for_VMware_SB_HR.pdf>, 2011, 2 pages.
FalconStor Software, "Unified Backup & DR for Vmware Environments", falconstor.com/dmdocuments/UniBU-DR_CDP_SB_100520.pdf>, 2001, 2 pages.
FalconStor Software, "Zero-impact Unified Backup & DR", <falconstor.com/solutions/solutions-for-server-virtualization/vmware-solutions/zero-impact-unified-backup-a-dr>, undated, internet accessed May 2, 2012, 1 page.
International Search Report and Written Opinion for International Application No. PCT/US10/62146, Mail Date Feb. 18, 2011, 9 pages.
International Search Report and Written Opinion for International Application No. PCT/US2004/038323, date of mailing Feb. 19, 2008 10 pages.
Microsoft, "Microsoft System Center Data Protection Manager 2007: Microsoft Exchange Server," undated, 4 pages.
Microsoft, "Microsoft System Center Data Protection Manager 2007: Microsoft SharePoint Products and Technologies," undated, 4 pages.
Robinson, Simon, "CommVault Unveils QiNetix to Unite Data Movement with Storage Management", 451 Research, Oct. 11, 2002, 3 pages.
Tanenbaum, Andrew S. Structured Computer Organization, 1984, Prentice-Hall, Inc. second edition, pp. 10-12.
Veritas Software Corporation, "Veritas Volume Manager 3.2, Administrator's Guide," Aug. 2001, 360 pages.
Armstead et al., "Implementation of a Campus-wide Distributed Mass Storage Service: The Dream vs. Reality," *IEEE*, Sep. 11-14, 1995, pp. 190-199.
Arneson, "Mass Storage Archiving in Network Environments," Digest of Papers, Ninth IEEE Symposium on Mass Storage Systems, Oct. 31, 1998-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, Jun. 12-16, 1994, pp. 124-126.
Jander, M., "Launching Storage-Area Net," *Data Communications*, US, McGraw Hill, NY, vol. 27, No. 4 (Mar. 21, 1998), pp. 64-72.
Gait, J., "The Optical File Cabinet: A Random-Access File System for Write-Once Optical Disks," *IEEE Computer*, vol. 21, No. 6, pp. 11-22 (Jun. 1988).
Rosenblum et al., "The Design and Implementation of a Log-Structured File System," *Operating Systems Review SIGOPS*, vol. 25, No. 5, New York, US, pp. 1-15 (May 1991).
Partial Supplementary European Search Report in Application No. 10841622.3, mailing date Feb. 11, 2015, 5 pages.
Extended European Search Report in Application No. 10841622.3, mailing date Jul. 29, 2015, 11 pages.

* cited by examiner

SYSTEMS AND METHODS FOR PERFORMING DATA MANAGEMENT OPERATIONS USING SNAPSHOTS

CROSS-REFERENCE TO RELATED APPLICATIONS

This application is a divisional of U.S. patent application Ser. No. 12/979,101, entitled "SYSTEMS AND METHODS FOR PERFORMING DATA MANAGEMENT OPERATIONS USING SNAPSHOTS," filed Dec. 27, 2010, which claims priority to and the benefit of U.S. Patent Application No. 61/291,803, entitled "SYSTEMS AND METHODS FOR PERFORMING DATA MANAGEMENT OPERATIONS USING SNAPSHOTS," filed on Dec. 31, 2009, and is related to U.S. patent application Ser. No. 12/558,947 filed on Sep. 14, 2009 (entitled "USING A SNAPSHOT AS A DATA SOURCE,") and U.S. patent application Ser. No. 12/978,984 filed on Dec. 27, 2010 (entitled "SYSTEMS AND METHODS FOR ANALYZING SNAPSHOTS,"), each of which is incorporated by reference in its entirety.

BACKGROUND

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically for intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is backed up, a pointer or other location indicia such as a stub may be placed in the primary copy to indicate the current location of that data.

One form of secondary copy is a snapshot copy. From an end-user viewpoint, a snapshot may be seen as an instant image of the primary copy data at a given point in time. A snapshot generally captures the directory structure of a primary copy volume at a particular moment in time, and also preserves file attributes and contents. In some embodiments, a snapshot may exist as a virtual file system, parallel to the actual file system. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup when stored at or near the file system. A snapshot may not actually create another physical copy of all the data, but may simply create pointers that are able to map files and directories to specific disk blocks. The snapshot may be a copy of a set of files and/or directories as they were at a particular point in the past. That is, the snapshot is an image, or representation, of a volume of data at a point in time. A snapshot may be as a secondary copy of a primary volume of data, such as data in a file system, an Exchange server, a SQL database, an Oracle database, and so on. The snapshot may be an image of files, folders, directories, and other data objects within a volume, or an image of the blocks of the volume.

Data storage systems utilize snapshots for a variety of reasons. One typical use of snapshots is to copy a volume of data without disabling access to the volume for a long period. After performing the snapshot, the data storage system can then copy the data set by leveraging the snapshot of the data set. Thus, the data storage system performs a full backup of a primary volume when a primary volume is active and generating real-time data. Although performing a snapshot (i.e., taking an image of the data set) is a fast process, the snapshot is typically not an effective or reliable backup copy of a data set, because it does not actually contain the content of the data set. Restoring data from snapshots can be especially cumbersome, because a restoration process cannot restore the data set using snapshots alone. Recovery of individual files or folders can be especially cumbersome, because typical systems often recover an entire snapshot in order to restore an individual file or folder imaged by the snapshot.

However, the speed of performing, or taking, a snapshot can often be a great benefit to data storage systems that are required to store large amounts of data. Thus, utilizing snapshots in ways other than those described above may provide significant utility to data storage systems, because snapshots are fast, are space efficient, and facilitate performing off host data storage operations, among other advantages.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
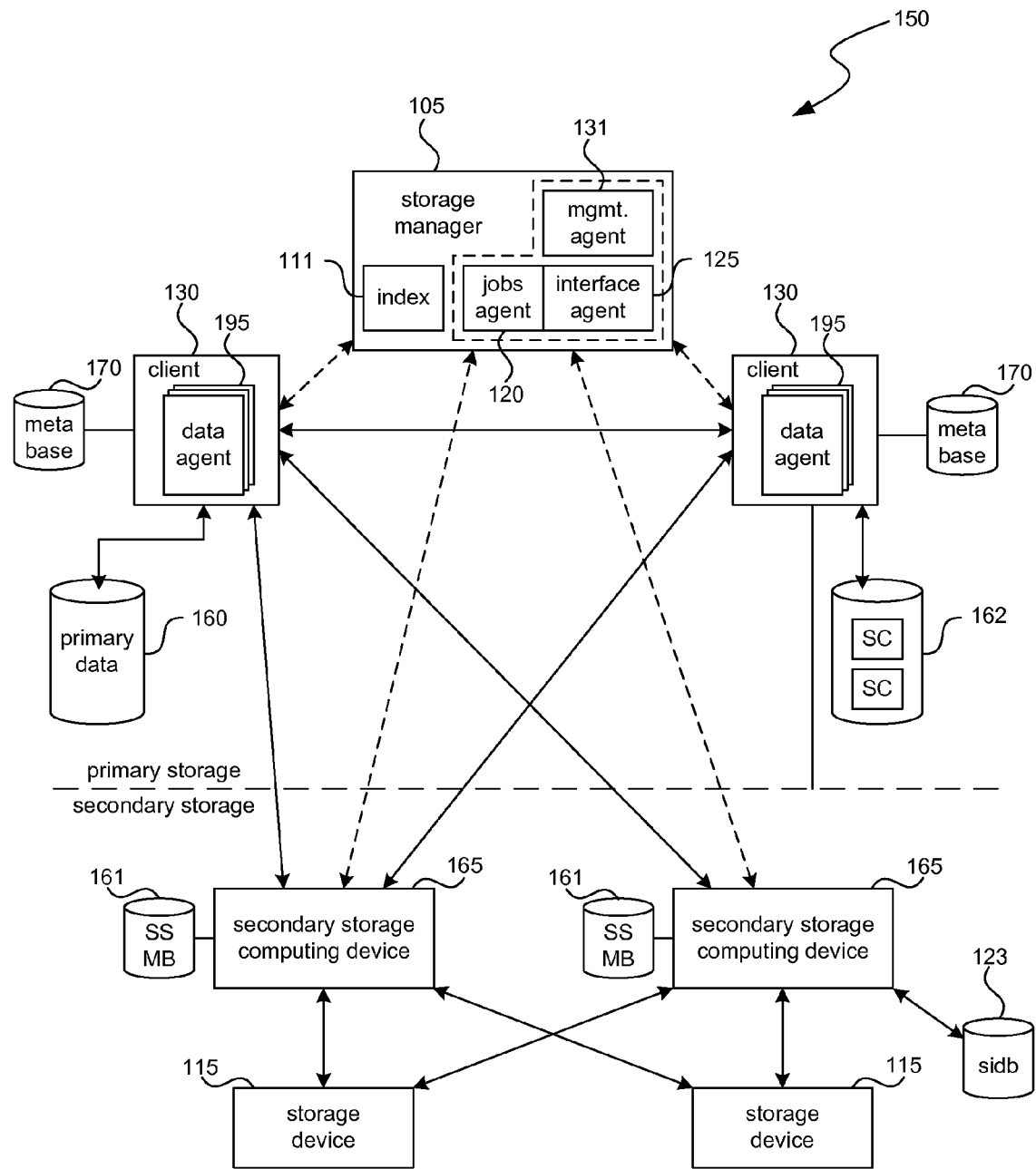
FIG. 1 is a block diagram illustrating an example of a data storage system that may employ aspects of the invention

The headings provided herein are for convenience only and do not necessarily affect the scope or meaning of the claimed invention.

Overview

Described in detail herein is a system and method that employs snapshots as data sources, such as backup copies of data. Instead of treating a snapshot only as a picture of a disk, the system employs snapshots as a data source that can be backed up or otherwise copied to tape or magnetic disk. The system can then seamlessly restore individual files from tape or disk using snapshots. The system creates a data structure, such as an index, that describes what is on a disk (as often defined by a file system for that disk). The index may provide a list of files on the disk, and location information indicating where each file is located, with respect to the snapshot.

In some examples, the system creates a secondary copy of data by storing a snapshot with an index associated with and/or related to the snapshot. The snapshot identifies the data stored in the secondary copy, and the index provides application specific context information that facilitates retrieving data identified by the snapshot. In these examples, the system may store a combination of a snapshot and associated index to storage media, such as to tape or disk, and use the stored combination as a data source, such as a backup copy of a primary volume of data.

The system may create the index in a number of ways, as long as the index can be used in combination with a snapshot to facilitate data storage and/or recovery via the snapshot. For example, an index agent may receive a snapshot of a data set, receive application context information associated with the snapshot, store the snapshot, and store the application context information in an index that identifies individual files from the data set imaged by the snapshot.

In some examples, the system provides for the recovery, or restoration, of data from a snapshot-based data source. The recovery may be transparent to a user (that is, the user does not know what mechanism is used during a restore process) and/or seamless with respect to other types of data sources. For example, the system may restore a data set by restoring a full backup of the data set using a snapshot-based secondary copy of the data set and incremental backups using other secondary copies.

In some cases, the system restores individual files using snapshots and associated indices. For example, the system may receive a request to restore a specific file or portion of a file, identify a snapshot containing an image of a volume containing the file, look to an index associated with the snapshot to identify the file, and retrieve the file (or a copy of the file) from information in the associated index. Thus, the system facilitates granular recovery of data objects within a data set without requiring a data recovery system to restore entire snapshots or secondary copies.

The system also facilitates techniques for enabling ancillary applications to perform functions using the snapshot data. Ancillary applications, such as indexing and search applications, electronic discovery applications, information management applications, tagging applications, as well as other applications, may require secondary copies to be in a specific format. In some examples, the techniques described herein provide an interface to snapshot data that is the same (or at least substantially similar) as an interface used to access secondary copies of data created using other techniques, such as backup or copy techniques. Accordingly, ancillary applications can perform functions on snapshot data using the same techniques used to perform functions on other secondary copies of data.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 2:
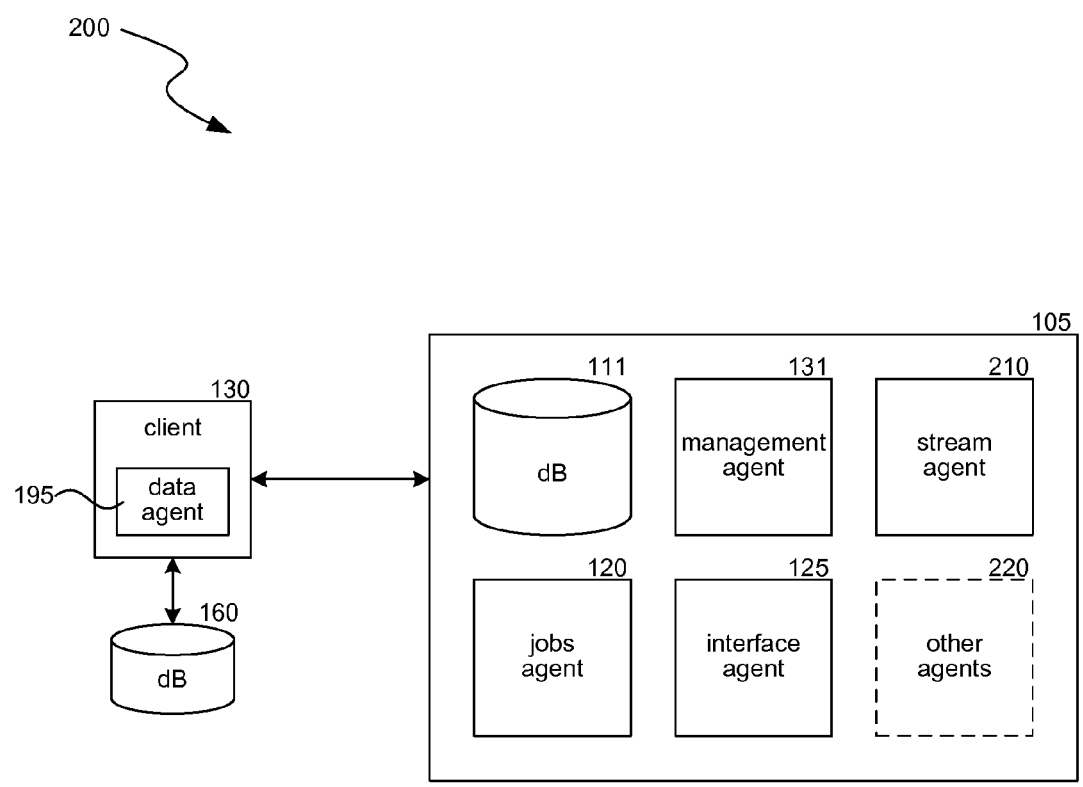
FIG. 2 is a block diagram illustrating in more detail certain components of a data storage system according to some examples.

FIGS. 1 and 2 and the discussion herein provide a brief, general description of suitable specialized environments in which aspects of the invention can be implemented. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular phones, mobile phones, and/or mobile devices, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), and/or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Figure 3:
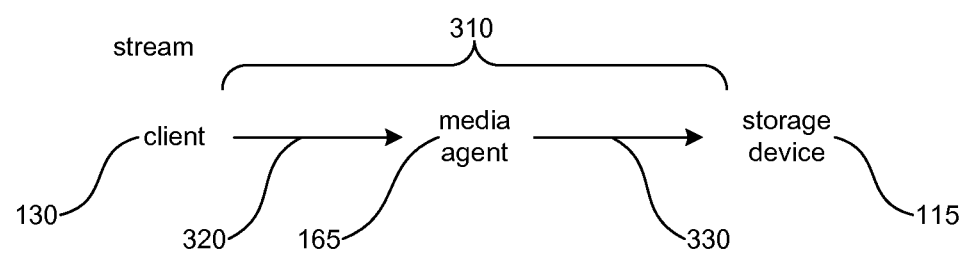
FIG. 3 illustrates components of a data stream that may be utilized by a data storage system.

Aspects of the invention will now be described in detail with respect to FIGS. 1 through 10. FIGS. 1-3, 9, and 11 illustrate various components of a data storage system that may employ aspects of the invention. FIG. 1 illustrates an example data storage system. FIG. 2 illustrates in more detail certain components of the example data storage system of FIG. 1. FIG. 3 illustrates components of a data stream that may be utilized by a data storage system in performing data storage operations. FIG. 9 illustrates in more detail certain components of the example data storage system of FIG. 1. FIG. 11 illustrates certain components of a client in a data storage system according to some examples.

Figure 4:
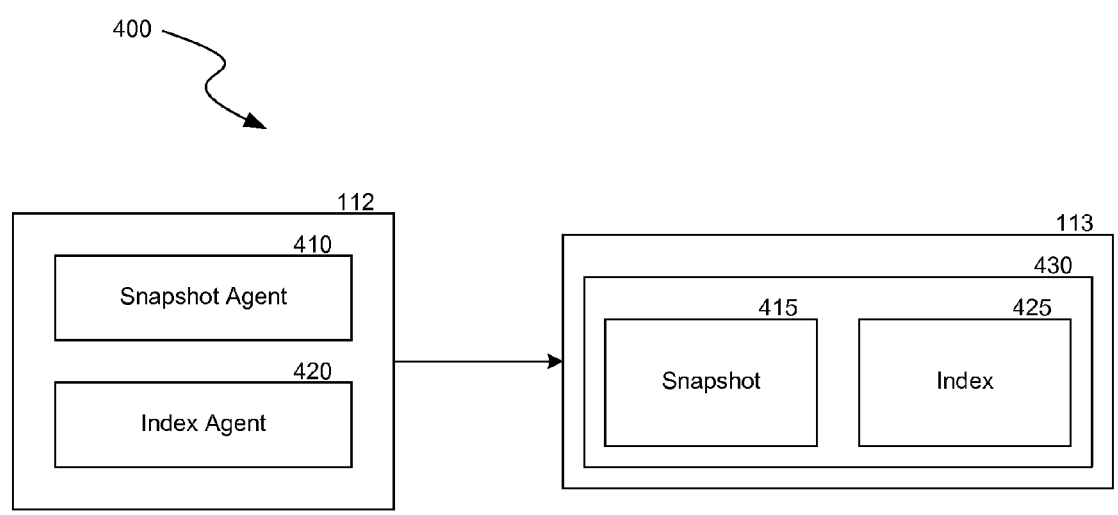
FIG. 4 is a block diagram illustrating a system for creating a snapshot-based secondary copy of data.
Figure 5:
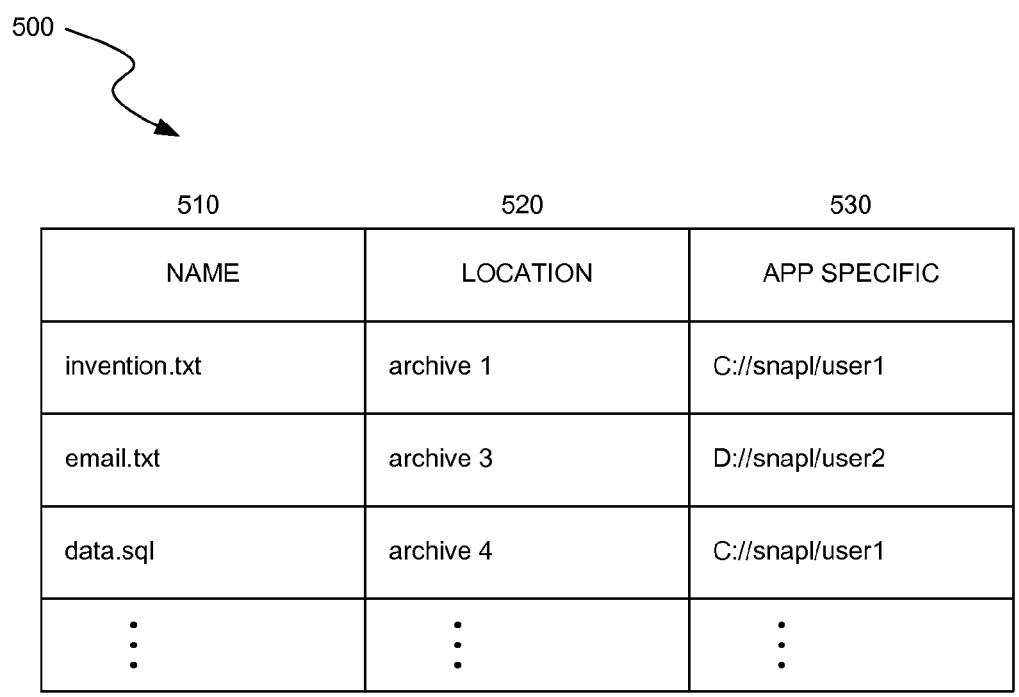
FIG. 5 is a table illustrating an index associated with a snapshot.

FIG. 4 illustrates a system for creating a snapshot-based on a secondary copy of data. FIG. 5 illustrates an index associated with a snapshot.

Figure 6:
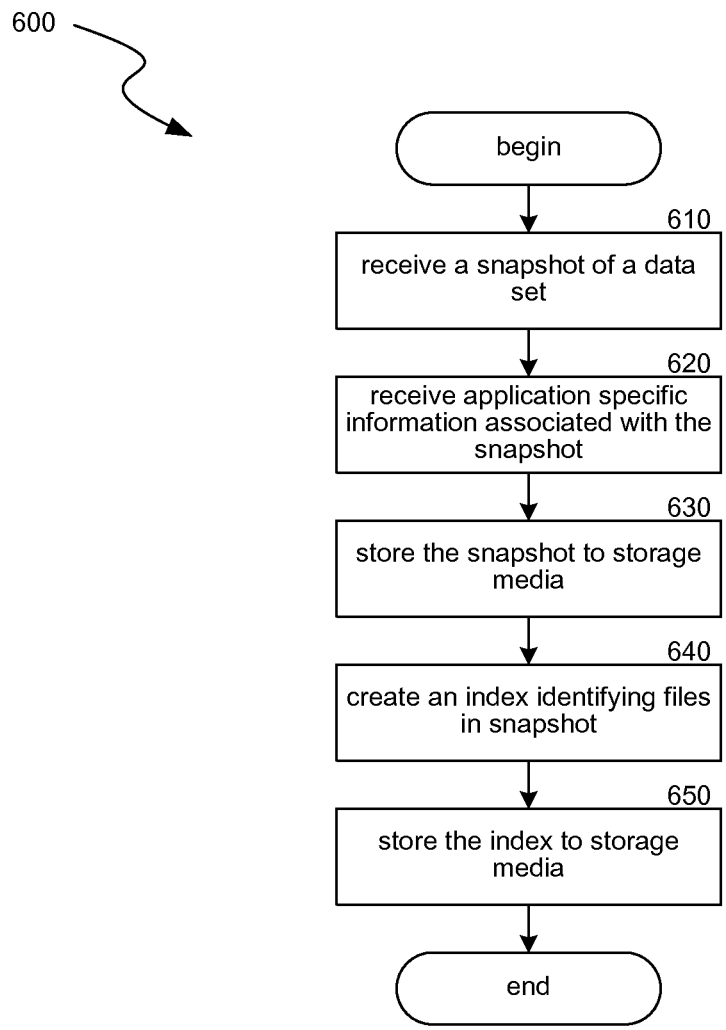
FIG. 6 is a flow diagram illustrating a routine for building an index.
Figure 7:
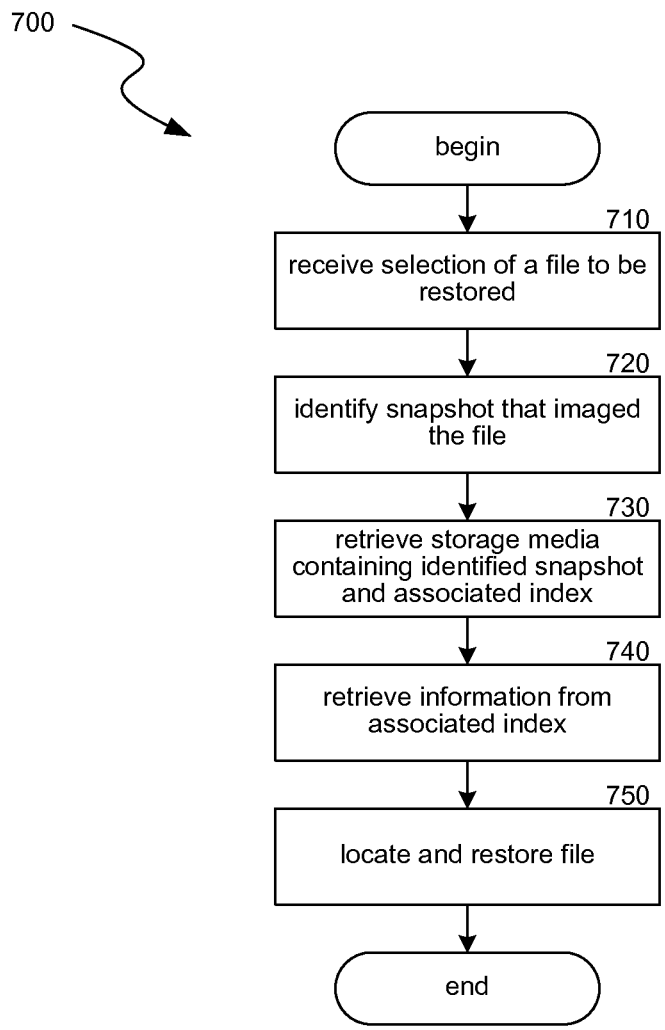
FIG. 7 is a flow diagram illustrating a routine for restoring a data object using a snapshot-based secondary copy.
Figure 8:
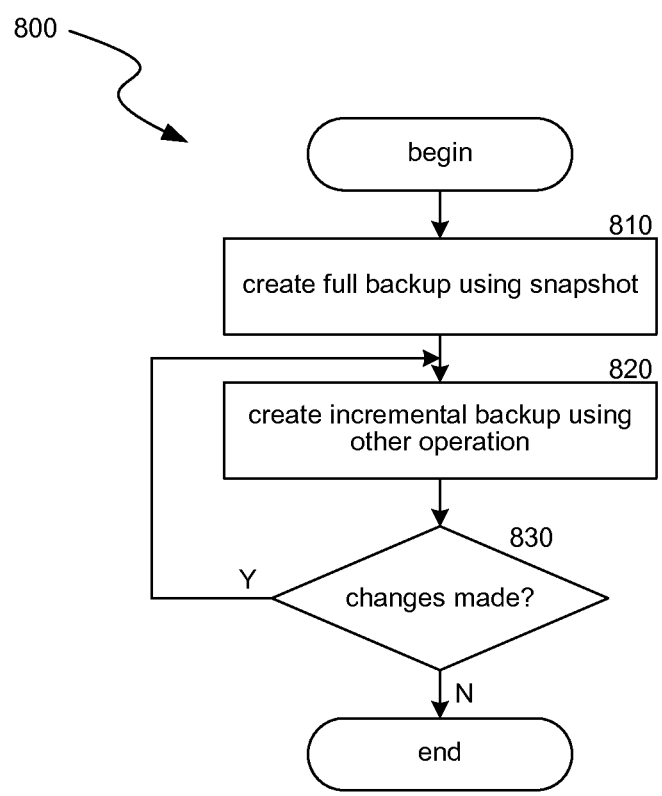
FIG. 8 is a flow diagram illustrating a routine for generating a secondary copy of a volume of data.
Figure 9:
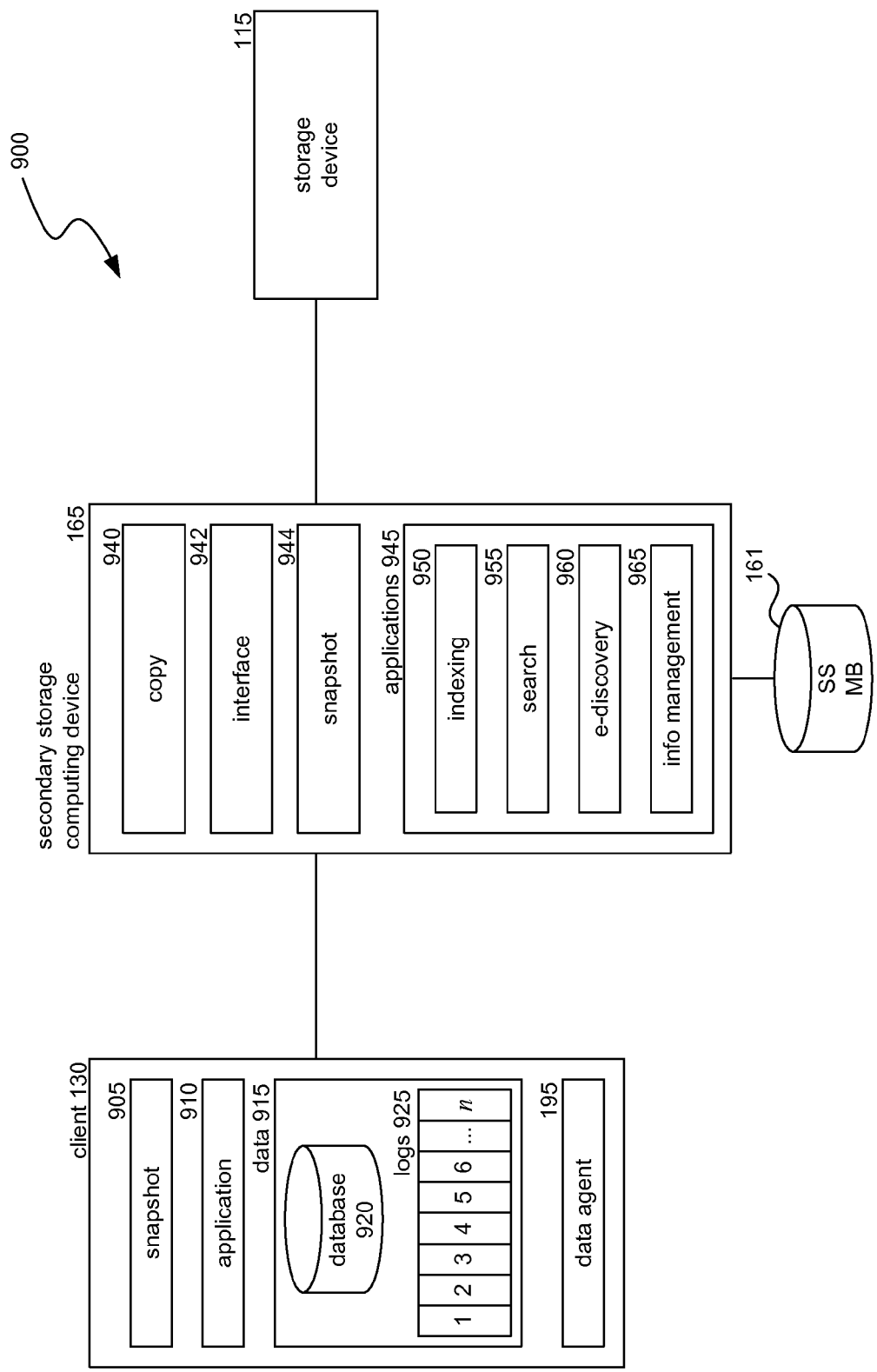
FIG. 9 is a block diagram illustrating in more detail certain components of a data storage system according to some examples.
Figure 10:
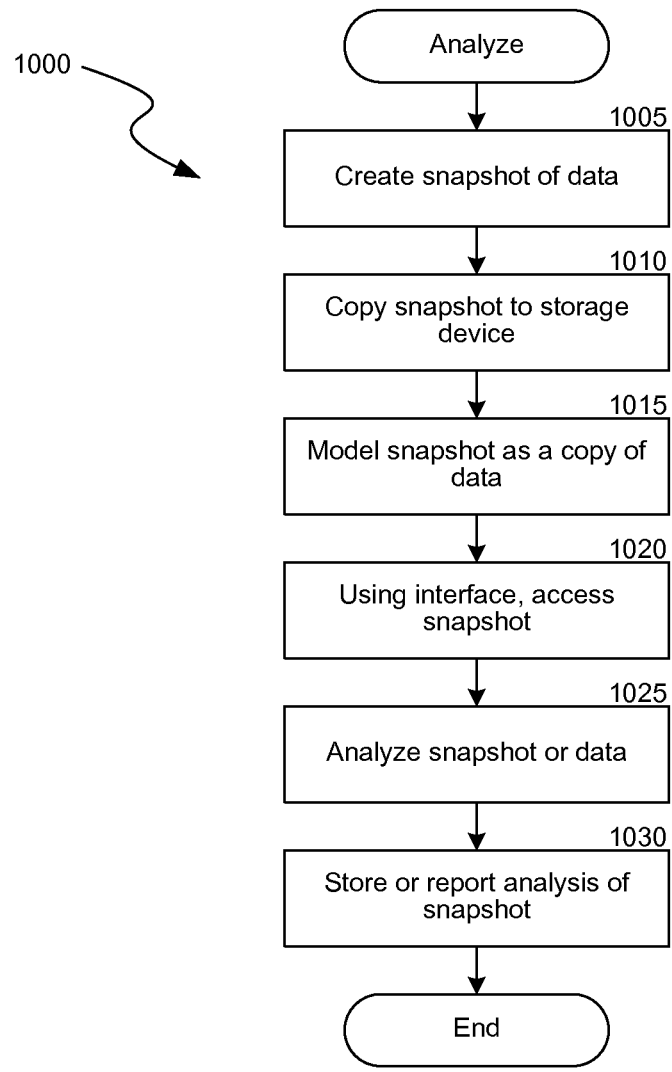
FIG. 10 is a flow diagram of a process for analyzing a snapshot.
Figure 11:
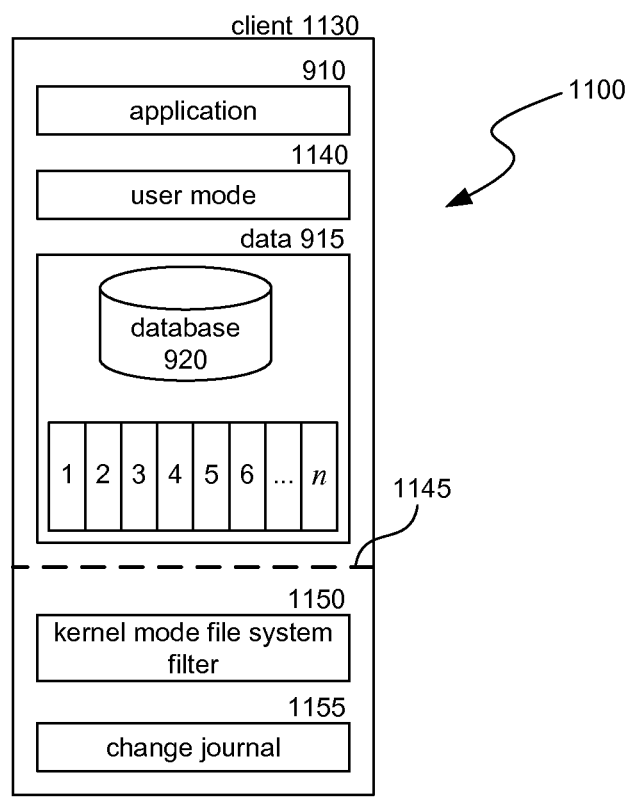
FIG. 11 is a block diagram illustrating certain components of a data storage system according to some examples.
Figure 12:
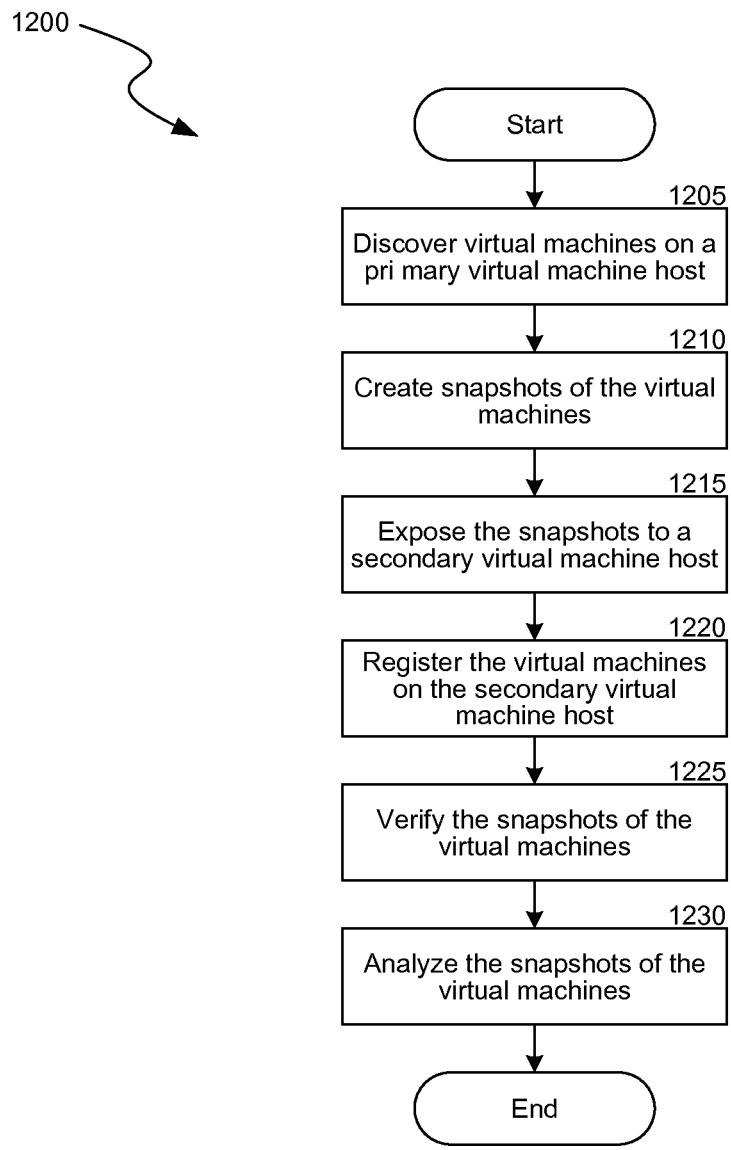
FIG. 12 is a flow diagram of a process for creating snapshots of virtual machines.

FIGS. 6-8 and 10 are process flow diagrams. FIG. 6 illustrates a routine for building an index. FIG. 7 illustrates a routine for restoring a data object using a snapshot-based secondary copy. FIG. 8 illustrates a routine for generating a secondary copy of a volume of data. FIG. 10 illustrates a process for analyzing snapshot data. FIG. 10 illustrates a process for analyzing a snapshot. FIG. 12 illustrates a process for creating snapshots of virtual machines and either verifying such snapshots, analyzing the data of the virtual machines, or both.

Suitable Data Storage System

FIG. 1 illustrates an example of one arrangement of resources in a computing network, comprising a data storage system 150. The resources in the data storage system 150 may employ the processes and techniques described herein. The system 150 includes a storage manager 105, one or more data agents 195, one or more secondary storage computing devices 165, one or more storage devices 115, one or more computing devices 130 (called clients 130), one or more data or information stores 160 and 162, and a single instancing database 123. The storage manager 105 includes an index 111, a jobs agent 120, an interface agent 125, and a management agent 131. The system 150 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 150 may also represent a modular storage system such as the CommVault Simpana system, also available from CommVault Systems, Inc.

The system 150 may generally include combinations of hardware and software components associated with performing storage operations on electronic data. Storage operations include copying, backing up, creating, storing, retrieving, and/or migrating primary storage data (e.g., data stores 160 and/or 162) and secondary storage data (which may include, for example, snapshot copies, backup copies, hierarchical storage management (HSM) copies, archive copies, and other types of copies of electronic data stored on storage devices 115). The system 150 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 115, retained for a specified period of time before being aged to another tier of secondary storage, copied to the storage device 115 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. A "retention policy" may specify how long data is to be retained at specific tiers of storage or what criteria must be met before data may be pruned or moved from one tier of storage to another tier of storage. In some cases, the storage policy includes information generally specified by the schedule policy and/or the retention policy. (Put another way, the storage policy includes the schedule policy and/or the retention policy.) Storage policies, schedule policies and/or retention policies may be stored in a database of the storage manager 105, to archive media as metadata for use in restore operations or other storage operations, or to other locations or components of the system 150.

The system 150 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 105 (or management agent 131), a secondary storage computing device 165, a client 130, and other components as described herein. A second storage operation cell may contain the same or similar physical components; however, it may be configured to perform a second type of storage operations, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 165, client 130, or other network device connected to a primary storage volume, while a storage operation cell configured to perform HSM tasks may instead include a secondary storage computing device 165, client 130, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 105 that coordinates storage operations via the same secondary storage computing devices 165 and storage devices 115. This "overlapping" configuration allows storage resources to be accessed by more than one storage manager 105, such that multiple paths exist to each storage device 115 facilitating failover, load balancing, and promoting robust data access via alternative routes.

Alternatively or additionally, the same storage manager 105 may control two or more storage operation cells (whether or not each storage operation cell has its own dedicated storage manager 105). Moreover, in certain embodiments, the extent or type of overlap may be user-defined (through a control console) or may be automatically configured to optimize data storage and/or retrieval.

The clients 130 typically include application software for performing various operations. Clients 130 typically also include an operating system on which the application software runs. A file system can be provided to facilitate and control file access by the operating system and application software. File systems can facilitate access to local and remote storage devices for file or data access and storage. Clients 130 can also include local storage such as a media module media drive with fixed or removable media.

In some examples, the clients 130 include storage mechanisms for allowing computer programs or other instructions or data to be loaded into memory for execution. Such storage mechanisms might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to memory.

Data agent 195 may be a software module or part of a software module that is generally responsible for performing storage operations on the data of the client 130 stored in data store 160/162 or other memory location. Each client 130 may have at least one data agent 195 and the system 150 can support multiple clients 130. Data agent 195 may be distributed between client 130 and storage manager 105 (and any other intermediate components), or it may be deployed from a remote location or its functions approximated by a remote process that performs some or all of the functions of data agent 195.

As used herein, the term module might describe a given unit of functionality that can be performed in accordance with one or more embodiments of the present invention. As used herein, a module might be implemented utilizing any form of hardware, software, firmware, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The overall system 150 may employ multiple data agents 195, each of which may perform storage operations on data associated with a different application. For example, different individual data agents 195 may be designed to handle Microsoft Exchange data, Lotus Notes data, Microsoft Windows file system data, Microsoft Active Directory Objects data, Microsoft SQL Server data, Microsoft Sharepoint Server data, and other types of data known in the art. Other embodiments may employ one or more generic data agents 195 that can handle and process multiple data types rather than using the specialized data agents described above.

If a client 130 has two or more types of data, one data agent 195 may be required for each data type to perform storage operations on the data of the client 130. For example, to back up, migrate, and restore all the data on a Microsoft Exchange server, the client 130 may use one Microsoft Exchange Mailbox data agent 195 to back up the Exchange mailboxes, one Microsoft Exchange Database data agent 195 to back up the Exchange databases, one Microsoft Exchange Public Folder data agent 195 to back up the Exchange Public Folders, and one Microsoft Windows File System data agent 195 to back up the file system of the client 130. These data agents 195 would be treated as four separate data agents 195 by the system even though they reside on the same client 130.

Alternatively, the overall system 150 may use one or more generic data agents 195, each of which may be capable of handling two or more data types. For example, one generic data agent 195 may be used to back up, migrate and restore Microsoft Exchange Mailbox data and Microsoft Exchange Database data while another generic data agent 195 may handle Microsoft Exchange Public Folder data and Microsoft Windows File System data, etc.

Data agents 195 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 105 or secondary storage computing devices 165. As used herein, a file or a data object refers to any collection or grouping of bytes of data that can be viewed as one or more logical units.

Generally speaking, storage manager 105 may be a software module or other application that coordinates and controls storage operations performed by the system 150. Storage manager 105 may communicate with some or all elements of the system 150, including clients 130, data agents 195, secondary storage computing devices 165, and storage devices 115, to initiate and manage storage operations (e.g., backups, migrations, data recovery operations, etc.).

Storage manager 105 may include a jobs agent 120 that monitors the status of some or all storage operations previously performed, currently being performed, or scheduled to be performed by the system 150. (One or more storage operations are alternatively referred to herein as a "job" or "jobs.") Jobs agent 120 may be communicatively coupled to an interface agent 125 (e.g., a software module or application). Interface agent 125 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 125, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 115).

Storage manager 105 may also include a management agent 131 that is typically implemented as a software module or application program. In general, management agent 131 provides an interface that allows various management agents 131 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 125. This allows each storage operation cell to send and receive certain pertinent information from other storage operation cells, including status information, routing information, information regarding capacity and utilization, etc. These communications paths may also be used to convey information and instructions regarding storage operations.

For example, a management agent 131 in a first storage operation cell may communicate with a management agent 131 in a second storage operation cell regarding the status of storage operations in the second storage operation cell. Another illustrative example includes the case where a management agent 131 in a first storage operation cell communicates with a management agent 131 in a second storage operation cell to control storage manager 105 (and other components) of the second storage operation cell via management agent 131 contained in storage manager 105.

Another illustrative example is the case where management agent 131 in a first storage operation cell communicates directly with and controls the components in a second storage operation cell and bypasses the storage manager 105 in the second storage operation cell. If desired, storage operation cells can also be organized hierarchically such that hierarchically superior cells control or pass information to hierarchically subordinate cells or vice versa.

Storage manager 105 may also maintain an index, a database, or other data structure 111. The data stored in database 111 may be used to indicate logical associations between components of the system, user preferences, management tasks, media containerization and data storage information or other useful data. For example, the storage manager 105 may use data from database 111 to track logical associations between secondary storage computing device 165 and storage devices 115 (or movement of data as containerized from primary to secondary storage).

Generally speaking, the secondary storage computing device 165, which may also be referred to as a media agent, may be implemented as a software module that conveys data, as directed by storage manager 105, between a client 130 and one or more storage devices 115 such as a tape library, a magnetic media storage device, an optical media storage device, or any other suitable storage device. In one embodiment, secondary storage computing device 165 may be communicatively coupled to and control a storage device 115. A secondary storage computing device 165 may be considered to be associated with a particular storage device 115 if that secondary storage computing device 165 is capable of routing and storing data to that particular storage device 115.

In operation, a secondary storage computing device 165 associated with a particular storage device 115 may instruct the storage device to use a robotic arm or other retrieval means to load or eject a certain storage media, and to subsequently archive, migrate, or restore data to or from that media. Secondary storage computing device 165 may communicate with a storage device 115 via a suitable communications path such as a SCSI or Fibre Channel communications link. In some embodiments, the storage device 115 may be communicatively coupled to the storage manager 105 via a SAN.

Each secondary storage computing device 165 may maintain an index, a database, or other data structure 161 that may store index data generated during storage operations for secondary storage (SS) as described herein, including creating a metabase (MB). For example, performing storage operations on Microsoft Exchange data may generate index data. Such index data provides a secondary storage computing device 165 or other external device with a fast and efficient mechanism for locating data stored or backed up. Thus, a secondary storage computing device index 161, or a database 111 of a storage manager 105, may store data associating a client 130 with a particular secondary storage computing device 165 or storage device 115, for example, as specified in a storage policy, while a database or other data structure in secondary storage computing device 165 may indicate where specifically the data of the client 130 is stored in storage device 115, what specific files were stored, and other information associated with storage of the data of the client 130. In some embodiments, such index data may be stored along with the data backed up in a storage device 115, with an additional copy of the index data written to index cache in a secondary storage device. Thus the data is readily available for use in storage operations and other activities without having to be first retrieved from the storage device 115.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 115. In some embodiments, the cached information may include information regarding format or containerization of archives or other files stored on storage device 115.

One or more of the secondary storage computing devices 165 may also maintain one or more single instance databases 123. Single instancing (alternatively called data deduplication) generally refers to storing in secondary storage only a single instance of each data object (or data block) in a set of data (e.g., primary data). More details as to single instancing may be found in one or more of the following commonly-assigned U.S. patent applications: 1) U.S. patent application Ser. No. 11/269,512 (entitled SYSTEM AND METHOD TO SUPPORT SINGLE INSTANCE STORAGE OPERA- TIONS); 2) U.S. patent application Ser. No. 12/145,347 (entitled APPLICATION-AWARE AND REMOTE SINGLE INSTANCE DATA MANAGEMENT); or 3) U.S. patent application Ser. No. 12/145,342 (entitled APPLICATION-AWARE AND REMOTE SINGLE INSTANCE DATA MANAGEMENT, 4) U.S. patent application Ser. No. 11/963,623 (entitled SYSTEM AND METHOD FOR STORING REDUNDANT INFORMATION); 5) U.S. patent application Ser. No. 11/950,376 (entitled SYSTEMS AND METHODS FOR CREATING COPIES OF DATA SUCH AS ARCHIVE COPIES); 6) U.S. patent application Ser. No. 12/565,576 (entitled SYSTEMS AND METHODS FOR MANAGING SINGLE INSTANCING DATA; or 7) U.S. patent application Ser. No. 12/647,906 (entitled BLOCK-LEVEL SINGLE INSTANCING), each of which is incorporated by reference herein in its entirety.

In some examples, the secondary storage computing devices 165 maintain one or more variable instance databases. Variable instancing generally refers to storing in secondary storage one or more instances, but fewer than the total number of instances, of each data block (or data object) in a set of data (e.g., primary data). More details as to variable instancing may be found in the commonly-assigned U.S. patent application Ser. No. 12/649,454 (entitled STORING A VARIABLE NUMBER OF INSTANCES OF DATA OBJECTS).

In some embodiments, certain components may reside and execute on the same computer. For example, in some embodiments, a client 130 such as a data agent 195, or a storage manager 105, coordinates and directs local archiving, migration, and retrieval application functions as further described in the previously-referenced U.S. patent application Ser. No. 09/610,738. This client 130 can function independently or together with other similar clients 130.

As shown in FIG. 1, each secondary storage computing device 165 has its own associated metabase 161. Each client 130 may also have its own associated metabase 170. However in some embodiments, each "tier" of storage, such as primary storage, secondary storage, tertiary storage, etc., may have multiple metabases or a centralized metabase, as described herein. For example, rather than a separate metabase or index associated with each client 130 in FIG. 1, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 105 or other management module may keep track of certain information that allows the storage manager 105 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 130, and can contain either all of the data of the clients 130 or a designated subset thereof. As depicted in FIG. 1, the data store 162 includes two sub-clients. For example, an administrator (or other user with the appropriate permissions; the term administrator is used herein for brevity) may find it preferable to separate email data from financial data using two different sub-clients having different storage preferences, retention criteria, etc.

Referring to FIG. 2, a block diagram illustrating an example of components of a server used in data storage operations is shown. A server, such as storage manager 105, may communicate with clients 130 to determine data to be copied to storage media. As described above, the storage manager 105 may contain a jobs agent 120, a management agent 131, a database 111, a stream agent 210, an interface agent 125, and/or other agents 220. Jobs agent 120 may manage and control the scheduling of jobs (such as copying data files) from clients 130 to storage devices 115. Management agent 131 may control the overall functionality and processes of the data storage system, or may communicate with global managers. Database 111 or another data structure may store storage policies, schedule policies, retention policies, or other information, such as historical storage statistics, storage trend statistics, and so on. Interface agent 124 may interact with a user interface, enabling the system to present information to administrators and receive feedback or other input from the administrators or with other components of the system (such as via APIs). The other agents 220 may perform additional functions.

Referring to FIG. 3, a block diagram illustrating components of a data stream 310 that may be utilized by a data storage system is shown. The stream 310 may originate from a client 130, continue (as indicated by reference character 320) to a media agent 165 and then (as indicated by reference character 330) to a secondary storage device 115. For example, in storage operations, the system may store, receive and/or prepare data to be stored, copied or backed up at a server or client 130. The system may then transfer the data to be stored to media agent 165, which may then refer to storage policies, schedule policies, and/retention policies (and other policies) to choose a secondary storage device 115. The media agent 165 may include a snapshot agent and an index agent (although these agents may also be separate components). The secondary storage device 115 receives the data from the media agent 165 and stores the data as a secondary copy. Secondary storage devices may be magnetic tapes, optical disks, USB and other similar media, disk and tape drives, and so on. Of course, the data storage system may employ other configurations of stream components not shown in FIG. 3.

Snapshots as Data Sources, Such as Backup Copies of a Data Set

The system may store one or more snapshots with an associated index in order to create a snapshot-based data source, such as a secondary copy of a primary volume of data. Data may be stored in various types of volumes, including primary copies or production copies, as well as various secondary copies, such as snapshots, backup copies, archival copies, and so on.

The system creates snapshots of blocks or chunks of data in a data store and an associated index that keeps track of the files imaged by the snapshot (e.g., which blocks are associated with which files and what applications are associated with the files). Thus, a snapshot becomes a way of storing data that includes application specific data. The snapshots and associated index can then be used as auxiliary copies, synthetic full copies, partial or full restores, and other secondary copies. Using snapshots as a data source allow a data storage system to be very flexible. Also, the system can manage the snapshots, such as by backing them up and deleting any original versions from the system.

The system creates snapshots using a variety of mechanisms. In some examples, the system employs hardware-based snapshot mechanisms when creating snapshots. Examples of suitable hardware-based snapshot mechanisms include EMC's Symmetrix and Clarion, Hitachi Data Storage (HDS), Network Appliance's Snapshot, and so on.

In some examples, the system employs software-based snapshot mechanisms. For example, the system may leverage continuous data replication (CDR) or discrete data replication (DDR) when creating snapshots of a volume of data. CDR generates recovery points for a volume, which can be used as a point in time snapshot of a volume. Thus, leveraging the recovery points as snapshots enables the system to generate point-in-time copies (snapshots) of a volume of data while maintaining a live copy of the volume. Of course, other mechanisms are possible.

Further, if the data storage system employs hardware having particular capabilities, such as the ability to take mirror copies or multiple snapshots, that functionality may be utilized by the snapshot and associated index. Further, snapshots may be manipulated with application programming interfaces (APIs) provided by hardware and software providers.

Referring to FIG. 4, a block diagram illustrating a system for creating a snapshot-based secondary copy of data is shown. A media agent 112 includes a snapshot agent 410 and an index agent 420. The snapshot agent 410 creates a snapshot 415 of a primary data store or volume, and the index agent 420 creates an index 425 associated with the snapshot 415. The media agent 112 stores the snapshot 415 and index 425 as a secondary copy 430, which may be a backup copy, archive copy, and so on. The secondary copy 430, or snapshot-based secondary copy, is stored on storage media 113, such as magnetic tape, optical disk, magnetic disk, and so on. In some cases, the snapshot and index are logically linked within the secondary copy or across resources in a data storage enterprise. The storage media 113 may be located remotely from the media agent, or may be relocated to a geographically remote location after creation and storage of the secondary copy 430 is complete.

The system may employ a number of different mechanisms when moving snapshots to secondary storage, such as magnetic tape. In some examples, the system performs block-level or chunk-based migration or transfer of snapshots from primary storage to secondary storage.

Briefly, block-level migration, or block-based data migration, involves transferring or migrating disk blocks from a primary data store (e.g., a disk partition or volume) to secondary media. Using block-level migration, a data storage system transfers blocks on a disk that have not been recently accessed to secondary storage, freeing up space on the disk. Chunked file migration, or chunk-based data migration, involves splitting a data object into two or more portions of the data object, creating an index that tracks the portions, and storing the data object to secondary storage via the two or more portions. Among other things, the chunk-based migration provides for fast and efficient storage of a data object. Additionally, chunk-based migration facilitates fast and efficient recall of a data object, such as a snapshot of a large database or virtual machine file. For example, if a user modifies a migrated file, chunk-based migration enables a data restore component to only retrieve from, and migrate back to, secondary storage the chunk containing the modified portion of the file, and not the entire file. Further details regarding block-level and/or chunk-based data migration may be found in U.S. patent application Ser. No. 12/553,199 entitled TRANSFERRING OR MIGRATING PORTIONS OF DATA OBJECTS, SUCH AS BLOCK-LEVEL DATA MIGRATION OR CHUNK-BASED DATA MIGRATION, which is hereby incorporated by reference in its entirety.

The snapshot agent 410 creates, takes, produces, and/or generates a snapshot or multiple snapshots of a data source, such as a primary volume of data or a secondary copy of a primary volume. As discussed herein, the snapshot is a representation of a set of data objects at a given point in time. The snapshot may be a complete image of a data set, or may be an incremental image of a data set. Further details with respect to the snapshot process and the types of snapshots may be found in U.S. patent application Ser. No. 10/990,353, filed on Nov. 15, 2004, entitled SYSTEM AND METHOD FOR PERFORMING AN IMAGE LEVEL SNAPSHOT AND FOR RESTORING PARTIAL VOLUME DATA.

Information regarding a snapshot is stored in a data structure. For example, a data structure may be generally organized like the following data structure:

```
{
    Snapshot Identifiers
    Snapshot Engine Identifiers
    Source Identifiers
    Destination Identifiers
    Creation Time
    Snapshot Group Identifiers
    Snapshot Type
    Storage Operation Identifiers
    Flags
    Snapshot Pruning Information
}
```

In the above data structure, the Snapshot Identifiers may include information used to uniquely identify the snapshot. The Snapshot Engine Identifiers may include information used to identify the engine that performed the snapshot. Source Identifiers and Destination Identifiers may include information about the source of the data of which a snapshot was made and where the snapshot is stored, respectively. Creation Time may be a timestamp indicating when the snapshot was made. The Snapshot Group Identifiers may identify a group to which the snapshot belongs. The Snapshot Type may include information identifying a type of the snapshot. The Storage Operation Identifiers may include information identifying a storage operation and/or storage operation elements associated with the snapshot. Flags may include one or more flags or bits set to indicate various types of information regarding the snapshot, and Snapshot Pruning Information may include information about whether or not the snapshot can be pruned.

The index agent 420 creates, generates, and/or builds a data structure, such as an index, to be associated with one or more snapshots. As described more fully below, the index may be a two tier index, may be a three tier index, or may have other index configurations, depending on the needs of the system. The two tier index may include a first entry that contains information identifying a data object, such as a file or folder, and a second entry that identifies where the file or folder is located. As an alternative, the second entry may indicate where an archive file (the file stripped of its native format) is located.

The three tier index includes the first and second entries as well as a third entry that contains the application specific data discussed herein. For example, the third entry, or tier, may contain information identifying an original mount point for an associated snapshot.

The three tier index may track specific files on a snapshot that are of interest. The three tier index describes what is on the disk (or tape), and not just the second tier index description of a file. The third tier may include an entry including information that identifies where to find data when needed within the snapshot-based on an indication of what files were on the disk when the snapshot was taken, and where they were located.

For example, the index agent 420 creates the index 425 relative to a file system associated with the disk, so as to explain all the files on that disk and their locations. The index tracks an original mount point, so recovery systems can find network accessible data as and when the data moves among network resources. For example, an original file named "system.txt" may have an original mount point at "E:/mount/snap1/user1/system.txt," but the snapshot imaging the file may subsequently be remounted at a mount point at "F:/user1/system.txt." The index, via the third tier, may track such information, such as information associated with movement of the files.

Thus, the file system identifies or presents the files of interest to the index agent to create the new index. The index maps contextual information associated with a snapshot of a volume. The index data identifies an application with files of interest. Alternatively or additionally, the system may employ content indexing functions to discover content and provide that as a separate content index. Further details may be found in U.S. patent application Ser. No. 12/058,487, filed on Mar. 28, 2008, entitled METHOD AND SYSTEM FOR OFFLINE INDEXING OF CONTENT AND CLASSIFYING STORED DATA.

In some examples, the system creates an archive file when creating an archive copy or other secondary copies of a data set, such as a data set originating in a file system. The creation of an archive file enables the system, when storing or restoring data, to have both a logical view and a physical view of stored data. The logical view, represented by the archive file, enables the system to store data having a format that is neutral (or, independent) with respect to data type. The physical view, represented by an index of locations on stored physical media, enables the system to locate the data stored on the physical media as chunks, tape extents, or blocks of the archive file.

The three tier index may include two entries associated with a location of the file, such as information identifying a snapshot that imaged the file as well as information identifying a location on secondary storage that contains the file. An additional entry provides application specific data for the file, such as metadata. Thus, in some cases, the system creates a backup copy of a primary volume that includes a snapshot of the primary volume and a three tier index that contains information associated with an identification of the file, information identifying a location of an archive file associated with the file, and information providing application context information about the file (such as an original mount point for the snapshot).

Referring to FIG. 5, a table illustrating a three tier index 500 associated with a snapshot is shown. The index 500 includes a file identification entry 510 that contains a name of a file, a location entry 520 that contains location information associated with a primary copy of the file, a secondary copy of the file, an archive format copy of the file, and so on, and a context or application specific entry 530 that provides information about a file system that created the file, such as an original mount point for the snapshot when the file was imaged by the snapshot. (Of course, the index 500 may include other or different information than what is shown in the Figure). For example, the location entry 520 may identify or provide identification information for the storage media, mount point, tape drive, and so on, associated with creating, updating, and/or storing a copy of the data, such as a secondary copy. In some cases, it may also provide media specific information, such as offsets on a magnetic tape. The location entry 520 may refer to a storage manager or other data storage resource when identifying a location of a copy, such as a location on a tape.

As one example, the index 500 includes information associated with a data object named "Invention.txt." This information includes a location of the archive file for the data object at "archive1" and information identifying a mount point for the snapshot that imaged the data object, at "C://snap1/user1." The index 500 may contain information about some files imaged by a snapshot (such as certain files of interest), or may contain information about all the files imaged by the snapshot. The system may build the index as follows.

Referring to FIG. 6, a flow diagram illustrating a routine 600 for building an index is shown. In step 610, an index agent receives a snapshot of a data set. For example, the snapshot agent within (or outside of) the media agent 112 creates the snapshot 415 of a primary volume of data, and sends the snapshot to the index agent.

In step 620, the index agent 420 receives or obtains context information associated with the snapshot. The index agent may query some or all of the data storage resources, such as a storage manager or jobs agent, to retrieve data associated with systems and applications that created the snapshot. For example, the index agent may query the Volume Snapshot Service (VSS) provider used to create the snapshot. The index agent may retrieve information for each of the individual files imaged by the snapshot, for the entire snapshot, or both. The application context information may include information about resources utilized by the snapshot agent (such as mount points), information from or about the file system and/or applications that created the snapshot, and so on.

In addition, the index agent calls the snapshot APIs to identify information associated with the snapshot. Examples of information received from the snapshot APIs include unique snapshot identifiers (which may be received from the snapshot hardware or generated by the index agent), source host information identifying the computing resource that originated the underlying data from which the snapshot was created, volume information, client identifiers, path identifiers, creation time, control host identifiers, source information, server identifiers, job identifiers, and so on. For example, the system, via an agent stored on a Microsoft Exchange server, may interact with an external RAID array on the Exchange server via APIs in order to retrieve information associated with snapshots performed on the Exchange server.

In step 630, the media agent stores the snapshot to storage media. For example, the media agent 112 transfers the snapshot 415 to storage media 430 using one or more of the data paths described with respect to FIG. 1. The media agent may store the snapshot to storage media based on a storage policy, and may select storage media based on the needs of the system and on the (future) use of the stored snapshot. For example, the system may store the snapshot to magnetic tape for archival purposes.

In step 640, the system stores the received application context information in an index that identifies individual files from the data set imaged by the snapshot, and in step 650, stores the index to the storage media. That is, the system builds an index, such as the three tier index described herein, to track information within the snapshot such that an original location of the data imaged by the snapshot can be determined from the index.

As an example, the system, via an index agent, receives a snapshot taken of a primary volume, such as "snap1." The system queries a VSS provider, and determines the snapshot occurred at the mount point "D:/users," and was performed by a mechanism known to the system as "hardsnapB." The system then stores the snapshot and the associated information to a magnetic tape, named "tape4," at location "offset100-230" The system then updates an index, such as an index at a media agent that stored the snapshot, to include information associated the name of the tape with the name of the snapshot stored on the tape. Thus, an example index entry may be as follows:

| Snap1 | D:/users, hardsnapB | Tape4, offset100-230 |
|---|---|---|

The system may store the entry at the media agent or at other storage resources, such as a global manager. In addition, the system stores the entry along with the snapshot on the tape, to facilitate restoration of the data via the snapshot, effectively creating a copy of data (i.e., a data source), using a snapshot of the data.

In addition to creating the index, the system may add data to an existing archive table file, or other tables, to recognize that a particular data copy is a snapshot. For example, a flag may be set in the archive table file to indicate to the system that a copy is a snapshot-based copy. This may facilitate discovery of the copy, for example.

In some examples, the three-tier or multiple entry index may be stored in different locations across a data storage system. For example, information associated with the location of a snapshot on secondary storage (such as tape offset information) and the application specific information may be stored in a cache of a media agent that transfers the snapshot to the secondary storage, while the snapshot metadata may be stored by a data management component. Of course, the various indices may be stored in other locations in order to meet the needs of the system.

Data Recovery Using Snapshot-Based Data Sources

As described herein, the recovery of data, such as individual files, may be performed by restoring data from snapshot-based secondary copies, such as backup copies. Referring to FIG. 7, a flow diagram illustrating a routine 700 for restoring a data object using a snapshot-based secondary copy is shown. In step 710, a data recovery system receives an indication, selection, or request for a data object to be restored. For example, the system may present to a user a user interface showing files available for restoration, and receive the request via display elements within the user interface. For example, the system may present the files shown in table 500 of FIG. 5.

In step 720, the system identifies the snapshot that imaged the selected file. For example, the system may include a table, map or other data structure of file names and associated snapshots, and use the map to identify a snapshot that imaged the file (e.g., table 500 of FIG. 5). In step 730, the system retrieves or accesses the storage media that contains the identified snapshot and an index associated with the snapshot. For example, if the user wishes to retrieve the file "invention.txt," the system may retrieve the snapshot that images the file "invention.txt" in order to identify a location for the file.

In step 740, the system retrieves information from the associated index. For example, the system retrieves the information associated with the selected file, such as information for an archive file associated with the selected file, information associated with the file system that created the selected file, and so on.

In step 750, the system locates and restores the selected file. For example, using the retrieved information from the associated index, the system locates the archive file and application specific information for the selected file, and restores the file.

As an example, a user wishes to restore "email.txt" from a data archive. A data recovery system receives input from the user to restore the file (step 710). The system, via table 500 of FIG. 5, identifies that the snapshot mechanism snap1 at mount point "D://snap1/user2" performed a snapshot of the file (step 720). The system identifies the location of the snapshot on storage media, at "archive 3" (step 730). In this example, the information "archive 3" identifies the specific storage medium as well as the location on the medium. The system then retrieves the snapshot and uses the retrieved snapshot and known information about the snapshot to locate the file for the user.

Thus, by utilizing a snapshot-based data source as the vehicle for data recovery, the system is able to take advantage of the speed of restoration associated with snapshots with the granularity associated with other backup methods, such as restoring individual files. The descriptive information in the index enables the system to quickly and efficiently identify the specific location of files imaged by the snapshot. That is, the combination of an image of a volume of a data (via a snapshot) and knowledge of the mechanisms and resources used to create the file system (via an associated index) enables the system to restore data quickly and efficiently.

Seamless Restoration of Data

As described herein, in some cases it may be advantageous to mix or use multiple, different data storage operations when creating a secondary copy of a primary volume of data. For example, a data storage system will create a full backup of a volume of data at a first point in time, and then incrementally backup the volume in subsequent points in time, only copying changes or modifications made to the volume of data after the full backup was created. Often, the full backup is more time-intensive and system-sensitive than incremental backups, because more data is being stored and system resources used during the full backup. Thus, a snapshot may be used to create the full backup, and other operations, such as continuous data replication of changes, copy-on-write snapshots, and so on, may be used for the subsequent incremental backups.

Referring to FIG. 8, a flow diagram illustrating a routine 800 for generating a secondary copy of a volume of data is shown. In step 810, the system creates a full backup of a primary volume using a snapshot-based copy mechanism. For example, the system performs a snapshot of the primary volume at a first time, stores the snapshot to storage media, builds an index associated with the snapshot as described herein, and stores the index to the storage media with the snapshot or otherwise logically links it with that snapshot.

In step 820, the system creates an incremental copy at a second, subsequent time. The system may employ continuous data protection (CDP) or other copy mechanisms, and may transfer data directly to tape or other storage media. CDP is advantageous because it virtually ensures an error free transfer of data to the tape or to another, often remote, data store. In step 830, the system reviews the volume for any changes to the volume. The system may also review a change journal or other similar data structure. When changes are identified, routine 800 proceeds back to step 820, and performs an additional backup. Thus, a secondary copy of a volume of data is created and constantly updated using backup processes well suited for the various tasks involved.

In order to restore data from such a secondary copy, the system may treat the different data sources in a similar fashion, thereby providing seamless and efficient data recovery to a user. For example, should the user wish to restore the entire volume, the system employs the fast snapshot-based recovery of the original data along with the safe, protected recovery of any subsequent changes to the data set. In addition, the system may provide for the restoration of individual files in a fast and effective manner, because the snapshot-based full backup is able to restore individual files without performing a full restore. Of course, in some cases it may be advantageous to create incremental copies as a snapshot-based data source. Additionally, the system may create a partial secondary copy as a snapshot-based data source and the rest of the secondary copy using other data storage operations.

In some examples, the system restores data from different types of secondary copies having different formats, such as snapshots and archive copies of data. The system may create and leverage an index that normalizes, or translates the different data formats during data recovery. The index may include information that identifies the original location of data, information that identifies the current location of the data, and/or information that identifies the type of media containing the data. Thus, during a restore process, the system may review this index in order to determine a relative path to requested data. In some cases, the system may provide a user with some or all versions under management by the system. The system may facilitate searches across the index, such as those described in U.S. patent application Ser. No. 11/931, 034, filed on Oct. 31, 2007, entitled METHOD AND SYSTEM FOR SEARCHING STORED DATA, which is incorporated by reference in its entirety.

For example, a request for "file1.doc" causes the system to review an index associating "file1.doc" with an original mount point (D:/snapshot1/) for a snapshot that imaged a volume containing "file1.doc," and a current location of the snapshot (X:/tape1/snapshot1/file1.doc) now stored in a non-native format. The system can then convert the retrieved copy of the requested file to a native format, identify a path to the original mount point, and provide the requested file.

The system may be employed by current data storage systems that have snapshot capabilities. For example, the index agent and/or the snapshot agent may be introduced into a data storage system that performs snapshots, but does not utilize them as data sources, enabling the data storage system to perform the data storage operations described herein.

Additional Functionality

Snapshots of primary data are typically linked to a storage device storing the primary data. In some conventional techniques, copying the snapshot to another storage device may sever links between the copy of the snapshot and the primary storage device. As a result, it may be difficult to recover data from the snapshot copy or analyze the snapshot copy. However, the techniques described herein provide for copying snapshots to a secondary storage device, while maintaining the ability to recover data from the snapshot copy. Data can be recovered from the snapshot copy on a full application basis or an individual, granular data object level (for example, individual files or folders, email messages, email folders, database objects, etc.).

The techniques described herein also enable additional uses of snapshot data. Ancillary applications, such as indexing and search applications, electronic discovery applications, information management applications, tagging applications, as well as other applications, can perform functions on snapshot data using the same (or at least generally similar) techniques used to perform functions on other secondary copies of data. As previously noted, the techniques described herein may facilitate additional uses of snapshot data by, among other things, providing an interface to snapshot data that is the same (or at least generally similar) as an interface used to access secondary copies of data created using other techniques, such as backup or copy techniques.

In some examples, this may be done by creating a logical view of snapshot data that is identical (or at least generally similar) to logical views of other secondary copies of data, such as backup copies of data. For example, upon creating a snapshot, a record of the snapshot and its metadata may be stored in a data structure that stores records pertaining to copies of data created by other storage operations, such as backup or copy operations. In some examples, the snapshot is modeled as if it were another type of secondary copy, such as a backup copy.

FIG. 9 is a block diagram illustrating in more detail certain components 900 of the data storage system 150 of FIG. 1. FIG. 9 depicts one of the clients 130, secondary storage computing device 165, secondary storage computing device index 161, and storage device 115.

In addition to the data agent 195, the client 130 includes a snapshot component 905, an application 910, and data 915. The application 910 may be any application executing on the client 130, such as a database server application (for example, Microsoft SQL server, Microsoft Active Directory Server, Oracle, etc.), an email server application (for example, Microsoft Exchange Server, Apache, etc.), or other types of servers (for example, application servers such as Microsoft SharePoint servers or web servers, virtual machine servers such as Microsoft Virtual Server, file servers, etc.). The application 910 has associated data 915, which includes a database 920 and logs 925, shown as logs one through n. The application 910 may write data to the database 920 using transactional techniques. That is, the application 910 may write changes to the logs 925 before committing the changes to the database 920.

The snapshot component 905 creates snapshots of the data 915 of the client 130. The snapshot component 905 includes software components and may also include hardware and/or firmware components. The snapshot component 905 may be provided in its entirety by a single entity (for example, a single vendor), or the snapshot component 905 may include sub-components that are provided by different entities (such as multiple vendors).

In some examples, the snapshot component includes a Microsoft Volume Shadow Copy Service (VSS) sub-component and a software-based VSS provider sub-component that is provided by the assignee of the present application, CommVault Systems, Inc. In these examples, the data agent 195 interacts with the Microsoft VSS sub-component to create snapshots. The Microsoft VSS sub-component notifies the application 910 to prepare the data 915 for creating a snapshot. The application 910 prepares the data 915 in an appropriate manner (such as completing open transactions, flushing caches, etc.). The Microsoft VSS sub-component initiates a commit phase and notifies the application 910 that the application 910 should be quiesced and to freeze writes to the data 915. The Microsoft VSS sub-component may also flush a file system buffer and freeze the file system to ensure that file system metadata is written and that the data 915 is written in a consistent order. The Microsoft VSS sub-component notifies the VSS provider sub-component to create the snapshot, and the VSS provider sub-component creates the snapshot. The Microsoft VSS sub-component then thaws the file system and notifies the application 910 that the application 910 can unquiesce and complete any writes to the data 915.

In other examples, in addition to or as an alternative to the software-based VSS provider sub-component, the snapshot component 905 includes other software-based VSS provider sub-components, such as a Microsoft system software provider, a Microsoft Data Protection Manager provider subcomponent or a NetApp SnapManager provider sub-component. These other software-based VSS provider sub-components may create snapshots in manners similar to the manner described in the preceding paragraph, or may use other techniques to create snapshots.

In other examples, in addition to the Microsoft VSS subcomponent, the snapshot component 905 includes one or more hardware-based VSS provider sub-components, such as those provided by vendors such as Hewlett-Packard, EMC, NetApp, IBM, and other vendors. These hardware-based VSS provider sub-components may create snapshots in manners similar to the manner described in the paragraph above, or may use other techniques to create snapshots. Those of skill in the art will understand that the snapshot component 905 may include various software-based and/or hardware-based sub-components and interact with other components in various ways in order to create snapshots of the data 915.

The snapshot component 905 may create snapshots using various techniques, such as copy-on-write, redirect-on-write, split mirror, copy-on-write with background copy, log structure file architecture techniques, continuous data protection techniques, and/or other techniques. The snapshot component 905 may store the created snapshots on a particular volume of the client 130.

The secondary storage computing device 165 includes a copy component 940 that copies snapshots from the client 130 to another storage device, such as storage device 115. The secondary storage computing device 165 also stores certain snapshot information and/or snapshot metadata in various data structures as described herein. The secondary storage computing device 165 may store snapshot information and/or snapshot metadata in secondary storage computing device index 161.

The secondary storage computing device 165 also includes an interface component 942. The interface component 942 provides access to the copied snapshot data. The interface component 942 can be used to access data objects created in other types of secondary copies, such as backup copies, archive copies, and other types of copies. The interface component 942 can also be used to display to a user available snapshots or point in time copies of the data 215 that can be used for recovery or other purposes. The secondary storage computing device 165 also includes a snapshot component 944. The snapshot component 944 may function similarly to the snapshot component 905.

The secondary storage computing device 165 also includes applications 945 that perform various functions using copied snapshot data. The applications 945 include an indexing component 950, a search component 955, an e-discovery component 960, and an information management component 965. As described in more detail below, the applications 945 access copied snapshot data stored on storage device 115 and data structures stored in secondary storage computing device index 161 in order to perform various functions.

FIG. 10 is a flow diagram of a process 1000 for analyzing a snapshot. The process 1000 begins at step 1005, where the data agent 195 creates a snapshot of the data 915. At step 1010, the snapshot is copied (for example, by the secondary storage computing device 165) to storage device 115.

As part of copying a snapshot, certain data objects referenced by the snapshot may also be copied to the storage device 115. For example, the first time a snapshot is copied over, all of the data objects (or blocks of data) referenced by the snapshot may also be copied to the storage device 115. However, subsequent copying of snapshot may copy over only data objects (or blocks of data) that have charged or been modified since the first full copy operation.

At step 1015, the snapshot data is modeled as a copy of the data 915. For example, the secondary storage computing device 165 may store snapshot information and/or snapshot metadata in secondary storage computing device index 161. This information stored in secondary storage computing device index 161 may be utilized by the interface component 942 to provide the interface to the snapshot data. At step 1020, the applications 945 access the snapshot data using the interface. At step 1025, the applications 945 analyze the snapshot data.

For example, the applications 945 may access the copied snapshot data, extract information (for example, textual information, binary objects, etc.) from the copied snapshot data, and populate one or more indices with the extracted information. For example, the applications 945 may index content of individual data objects and add information regarding the content to an index. To do so, the applications 945 may use techniques such as those described in commonly-assigned U.S. patent application Ser. No. 11/694,869 (entitled METHOD AND SYSTEM FOR OFFLINE INDEXING OF CONTENT AND CLASSIFYING STORED DATA), the entirety of which is incorporated herein.

As another example, the applications 945 may analyze and classify the copied snapshot data. To do so, the applications 945 may use techniques such as those described in commonly assigned U.S. patent application Ser. No. 11/564,119 (entitled SYSTEMS AND METHODS FOR CLASSIFYING AND TRANSFERRING INFORMATION IN A STORAGE NETWORK), the entirety of which is incorporated by reference herein. Additionally or alternatively, users may provide tags, attributes classifications and/or characterizations that are associated with copied snapshot data.

As another example, the applications 945 may single or variable instance or deduplicate the copied snapshot data. To do so, the applications 945 may use techniques described in one or more of previously-referenced U.S. patent application Ser. Nos. 11/269,512, 12/145,347, 12/145,342, 11/963,623, 11/950,376, 61/100,686, and 61/164,803.

In some examples, the applications may use techniques described in previously-referenced U.S. patent application Ser. No. 12/978,984 (entitled "SYSTEMS AND METHODS FOR ANALYZING SNAPSHOTS,") as part of the process of analyzing the copied snapshot data.

At step 1030, the applications 945 store the analysis of the snapshot data, such as in the secondary storage computing device index 161 and/or in other indices. For example, the indexing component 950 may store the results of the indexing of the snapshot data in a searchable index so that the data may be searched by users or other applications using search component 955. As another example, the e-discovery component 960 may analyze the snapshot data to identify data that is subject to a legal discovery request or other hold. Once such data is identified, the e-discovery component 960 may copy the data to another location, such as another storage device 115. As another example, the applications 945 may generate a report or display of the analyzed data. After step 1030, the process 1000 concludes.

In some examples, the client 130 does not include a data agent 195. Instead, the client 130 includes a software component that creates snapshots. The software component quiesces the application 910, takes a full snapshot of the data 915, monitors changes to the data 915, and causes changed data to be copied to the storage device 115. The software component may then create additional snapshots after the data is copied to the storage device 115. The software component may use copy-on-write techniques or other techniques.

Snapshots created by different snapshot providers may have different formats. Moreover, snapshots created using different techniques may also differ in format. One advantage of the techniques described herein is that snapshots created by various snapshot providers using various techniques can be analyzed by the applications 945. This is due at least in part to modeling the snapshot data as if it were another type of secondary copy and providing a common interface to the snapshot data. This allows the applications 945 to use standard techniques (for example, standard API functions or other functions) to access the snapshot data without requiring new or different interfaces to the snapshot data. Accordingly, the techniques described herein facilitate a common interface to disparate types of snapshot data.

Another advantage of the techniques described herein is that they provide for minimal disruption of production application data. This is due at least in part to the fact that snapshot creation usually requires a minimal amount of time to occur, therefore minimizing application downtime. It is also due at least in part to the fact that analysis of snapshots typically does not occur on production computing devices, therefore offloading possibly computationally expensive tasks to non-production computing devices. Another advantage of the techniques described herein is that they provide the ability to perform value added operations on snapshot copies of data even without the original application environment or host being available.

Remote Backup

Remote backup, alternatively referred to as Discrete Data Replication (DDR), enables the maintenance of application and file system data of a computing device on another storage device. Remote backup synchronizes application and file system data of the computing device on the other storage device. FIG. 11 is a block diagram of a client 1130 that may be used to perform remote backup according to some examples. The client 1130 includes a user mode component 1140 that operates in user mode and a kernel mode file system filter component 1150 and a change journal 1155 that operate in kernel mode (the logical distinction between user mode and kernel mode is shown as line 1145).

In some examples, the data 915 of the client 1130 is synchronized using the following process. The first time the data 915 is synchronized, the user-mode component 1140 engages with the application 910 and causes the application 910 to be quiesced. The user-mode component 1140 then performs or causes to be performed a full copy of the application data 915 to a storage device. The user-mode component 1140 may stage the copy in an intermediate location on the computing device before transferring it to the storage device.

After the full copy, the kernel mode file system filter 1150 detects changes to the application data 915 and records changes in the change journal 1155. At a scheduled time, the user-mode component 1140 again engages with the application 910 and causes the application 910 to be quiesced. Using the records of changed data recorded in the change journal 1155, the user-mode component 1140 then copies over data that has changed since the full copy to the storage device and updates the full copy. In some examples, each time that an update concludes, the user-mode component 1140 creates another snapshot of the application data 915. The snapshots could be created by software-based and/or hardware-based components.

Remote backup therefore enables the protection of application data 915 in a consistent state and also the restoration of the application data 915 to multiple points-in-time. In some examples, application data 915 can also be compressed and encrypted during the backup for efficiency and data security. The integrity of the application data 915 may also be verified during or after the transfer to the storage device.

Creating Snapshots of Virtual Machines

In general, virtualization refers to the simultaneous hosting of one or more operating systems on a physical computer. Such virtual operating systems and their associated virtual resources are called virtual machines. Virtual machines operate or execute on virtual machine hosts. One example of a virtual machine host is an ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Sun Microsystems Inc. of Santa Clara, Calif. More details as to virtualization may be found in the commonly-assigned U.S. patent application Ser. No. 12/553,294 (entitled SYSTEMS AND METHODS FOR MANAGEMENT OF VIRTUALIZATION DATA), the entirety of which is incorporated by reference herein.

Data protection operations such as snapshots can be performed upon virtual machine data. FIG. 12 is a flow diagram of a process 1200 for creating snapshots of virtual machines. The process 1200 begins at step 1205, where the system discovers one or more virtual machines being hosted by a primary virtual machine host. At step 1210, the system creates snapshots of the virtual machines. The system can employ hardware-based snapshot mechanisms and/or software-based snapshot mechanisms to create the snapshots of the virtual machines. For example, the system can utilize a hardware-based snapshot mechanism to create a mirrored point-in-time copy of the virtual machines.

In some examples, the system creates the snapshot of the virtual machines utilizing a virtual machine storage manager. A virtual machine storage manager is a computing system that does not host virtual machines but that performs data protection operations on virtual machine data. In such examples, the virtual machine storage manager contacts the primary virtual machine host, obtains information about the virtual machines that the primary virtual machine host is hosting, and utilizes such information to create the snapshots of the virtual machines.

At step 1215, the system exposes the snapshots to a secondary virtual machine host that is distinct from the primary virtual machine host. For example, the virtual machines may be VMware virtual machines that are hosted by a first ESX Server, and after the system has created the snapshots, the system exposes the snapshots to a second ESX server that is distinct from the first ESX server. Exposing the snapshots to the secondary virtual machine host can include providing read as well as write access to the snapshots. At step 1220, the system registers the virtual machines on the secondary virtual machine host. At step 1225, the system verifies that the snapshots were properly created. The system can verify the snapshots by powering on the virtual machines on the secondary virtual machine host. If the virtual machines are able to be powered on once registered to the secondary virtual machine host, such powering on indicates that the snapshots were properly created. After such verification, the system can power off the virtual machines on the secondary virtual machine host. At step 1230 the system analyzes the snapshots of the virtual machines, as described herein. After step 1230 the process 1200 concludes.

One advantage of the process 1200 is that the system can perform it to discover multiple virtual machines (e.g., tens or even hundreds of virtual machines) and create snapshots of the discovered virtual machines. Such snapshot creation can occur in a short period of time (e.g., on the order of seconds). The system can then verify that the snapshots were properly created by powering on the virtual machines on a secondary virtual machine host. Such verification can be done with no or reduced impact upon the primary virtual machine host. Another advantage is that the virtual machine data can be analyzed using the snapshots of the virtual machines. Other advantages will be apparent to those of skill in the art.

CONCLUSION

From the foregoing, it will be appreciated that specific examples of data storage systems have been described herein for purposes of illustration, but that various modifications may be made without deviating from the spirit and scope of the system. For example, although files may have been described herein, other types of content such as user settings, application data, emails, and other data objects (for example, blocks of data) can be imaged by snapshots. Accordingly, the system is not limited except as by the appended claims.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

The description of a synchronization process or synchronization processes is not intended to require that multiple synchronizations occur simultaneously or that multiple computing systems being synchronized each receive the same data. Although in some examples the data can be broadcast to all participating computing systems simultaneously (or close to simultaneously), in other examples the data can be sent to different computing systems or groups of computing systems at different times. Likewise, in some examples the same data, or the same subset of the data can be sent to all computing systems. However, in other examples, subsets of the data can be tailored for a given computing system or group of computing systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. As another example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the inventors reserve the right to add additional claims after filing the application to pursue such additional claim forms for other aspects of the invention.

I/We claim:

1. A method for creating snapshots of virtual machines, wherein the method is performed by a computing system having a processor and memory, the method comprising:
   receiving an indication of a discovery of one or more virtual machines are hosted by a primary virtual machine host,
   creating snapshots of the one or more virtual machines hosted by the primary virtual machine host, wherein the snapshots of the one or more virtual machines reference multiple data objects;
   creating at least one index associated with the snapshots, wherein the index includes context information related to logical locations of copies of the multiple data objects referenced by each of the snapshots;
   exposing the snapshots of the one or more virtual machines to at least one second virtual machine host;
   registering the one or more virtual machines on the at least one second virtual machine host via the exposed snapshots;
   powering on the one or more virtual machines on the at least one second virtual machine host;
   verifying that the snapshots of the one or more virtual machines were properly created based on the powering on of the one or more virtual machines on the at least one second virtual machine host; and
   in response to verifying that the snapshots were properly created, powering off the one or more virtual machines on the at least one secondary virtual machine host.

2. The method of claim 1 wherein the method further comprises accessing one or more of the multiple individual data objects.

3. The method of claim 1 wherein the snapshots references at least one set of data associated with an application, and wherein the application includes an email server, a Structured Query Language (SQL) server, a file server, or an application server.

4. The method of claim 1 wherein creating snapshots includes creating the snapshots at least partly with a hardware-based snapshot provider.

5. A non-transitory computer-readable storage medium whose contents cause a computing system to create snapshots of virtual machines, wherein the computing system has a processor and memory, comprising:
   receiving an indication of a discovery of one or more virtual machines are hosted by a primary virtual machine host,
   creating snapshots of the one or more virtual machines hosted by the primary virtual machine host, wherein the snapshots of the one or more virtual machines reference multiple data objects;
   creating at least one index associated with the snapshots, wherein the index includes context information related to logical locations of copies of the multiple data objects referenced by each of the snapshots;
   exposing the snapshots of the one or more virtual machines to at least one second virtual machine host;
   registering the one or more virtual machines on the at least one second virtual machine host via the exposed snapshots;
   powering on the one or more virtual machines on the at least one second virtual machine host;
   verifying that the snapshots of the one or more virtual machines were properly created based on the powering on of the one or more virtual machines on the at least one second virtual machine host; and
   in response to verifying that the snapshots were properly created, powering off the one or more virtual machines on the at least one secondary virtual machine host.

6. The non-transitory computer-readable storage medium of claim 5, further comprising accessing one or more of the multiple individual data objects.

7. The non-transitory computer-readable storage medium of claim 5 wherein the snapshots references at least one set of data associated with an application, and wherein the application includes an email server, a Structured Query Language (SQL) server, a file server, or an application server.

8. The non-transitory computer-readable storage medium of claim 5 wherein creating snapshots includes creating the snapshots at least partly with a hardware-based snapshot provider.

9. A system to create snapshots of virtual machines, comprising:
   at least one processor;
   at least one memory;
   a receiving component configured to receive an indication of one or more virtual machines,
   a creating component configured to create snapshots of the one or more virtual machines hosted by a primary virtual machine host, wherein the snapshots reference multiple data objects, and configured to create at least one index associated with the snapshots, wherein the index includes context information related to logical locations of copies of the multiple data objects referenced by each of the snapshots;
   an exposing component configured to expose the snapshots of the one or more virtual machines to the at least one second virtual machine host;
   a registering component configured to register the one or more virtual machines on the at least one second virtual machine host; and
   a powering component configured to power on the or more virtual machines on the at least one second virtual machine host, wherein powering on of the one or more virtual machines on the at least one second virtual machine host verifies that the snapshots of the one or more virtual machines were properly created, and configured to power off the one or more virtual machines on the at least one secondary virtual machine host after the verification that the snapshots were properly created.

10. The system of claim 9, further comprising an accessing component configured to access one or more of the multiple individual data objects.

11. The system of claim 9 wherein the snapshots reference at least one set of data associated with an application, and wherein the application includes an email server, a Structured Query Language (SQL) server, a file server, or an application server.

12. The system of claim 9 wherein the creating component is associated with a hardware-based snapshot provider.

* * * * *